United States Patent
Kang et al.

(10) Patent No.: US 11,747,284 B2
(45) Date of Patent: *Sep. 5, 2023

(54) APPARATUS FOR OPTIMIZING INSPECTION OF EXTERIOR OF TARGET OBJECT AND METHOD THEREOF

(71) Applicant: KOH YOUNG TECHNOLOGY INC., Seoul (KR)

(72) Inventors: Jin Man Kang, San Diego, CA (US); Filip Lukasz Piekniewski, San Diego, CA (US)

(73) Assignee: KOH YOUNG TECHNOLOGY INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/669,819

(22) Filed: Feb. 11, 2022

(65) Prior Publication Data
US 2022/0178841 A1    Jun. 9, 2022

Related U.S. Application Data

(63) Continuation of application No. 16/629,143, filed as application No. PCT/KR2018/007697 on Jul. 6, 2018, now Pat. No. 11,268,910.
(Continued)

(51) Int. Cl.
*G01N 21/88* (2006.01)
*G06T 7/00* (2017.01)

(52) U.S. Cl.
CPC ..... *G01N 21/8851* (2013.01); *G01N 21/8806* (2013.01); *G06T 7/0002* (2013.01);
(Continued)

(58) Field of Classification Search
CPC .......... G01N 21/8851; G01N 21/8806; G01N 2021/888; G01N 2021/8867; G01N 2021/8861; G06T 7/0002
See application file for complete search history.

(56) References Cited

U.S. PATENT DOCUMENTS 6,148,097 A * 11/2000 Nakayama ......... G01M 11/0264
382/141
6,333,992 B1   12/2001 Yamamura et al.
(Continued)

FOREIGN PATENT DOCUMENTS

JP    10-143660    5/1998
JP    2009-253100    10/2009
(Continued)

OTHER PUBLICATIONS

Chinese Office Action with English translation for Chinese Application No. or Publication No. 201880056933.9, dated Aug. 19, 2022.
(Continued)

*Primary Examiner* — Sang H Nguyen
(74) *Attorney, Agent, or Firm* — KILE PARK REED & HOUTTEMAN PLLC

(57) ABSTRACT

There is provided a technique that includes: a camera configured to capture images of the target object; a memory configured to store the images of the target object and feature data including one or more predetermined exterior features of the target object; and a processor configured to: determine a first process configuration for an operation including a plurality of image processes; perform the operation under the first process configuration; generate inspection data from the sets of images that have been processed; generate an inspection score by comparing the inspection data with the feature data; compare the inspection score with a predetermined threshold score; set the first process configuration as an optimal configuration if the inspection score satisfies the predetermined threshold score.

18 Claims, 7 Drawing Sheets

Related U.S. Application Data

(60) Provisional application No. 62/529,582, filed on Jul. 7, 2017.

(52) U.S. Cl.
CPC .................. *G01N 2021/888* (2013.01); *G01N 2021/8861* (2013.01); *G01N 2021/8867* (2013.01)

(56) References Cited

U.S. PATENT DOCUMENTS

| | | | |
|---|---|---|---|
| 7,106,895 | B1 | 9/2006 | Goldberg et al. |
| 7,945,105 | B1 | 5/2011 | Jaenisch |
| 8,781,212 | B2 | 7/2014 | Tsuchiya et al. |
| 2002/0051570 | A1 | 5/2002 | Inagaki |
| 2004/0146295 | A1 | 7/2004 | Furman et al. |
| 2005/0110987 | A1 | 5/2005 | Furman et al. |
| 2006/0244956 | A1 | 11/2006 | Furman et al. |
| 2006/0244957 | A1 | 11/2006 | Furman et al. |
| 2006/0244958 | A1 | 11/2006 | Furman et al. |
| 2007/0013903 | A1 | 1/2007 | Furman et al. |
| 2007/0019856 | A1 | 1/2007 | Furman et al. |
| 2011/0044529 | A1 | 2/2011 | Tsuchiya et al. |
| 2011/0320149 | A1 | 12/2011 | Lee et al. |
| 2013/0144102 | A1 | 6/2013 | Fuerstner et al. |
| 2014/0072203 | A1 | 3/2014 | Wu et al. |
| 2015/0221077 | A1 | 8/2015 | Kawabata et al. |
| 2015/0369752 | A1 | 12/2015 | Honda et al. |
| 2017/0241919 | A1* | 8/2017 | Machii ................. G01N 23/046 |
| 2017/0248525 | A1 | 8/2017 | Mayumi |
| 2017/0249727 | A1 | 8/2017 | Mayumi |
| 2017/0358069 | A1 | 12/2017 | Sagisaka et al. |
| 2018/0253017 | A1* | 9/2018 | Adel ..................... G03F 7/7085 |
| 2018/0347970 | A1 | 12/2018 | Sasaki |

FOREIGN PATENT DOCUMENTS

| | | |
|---|---|---|
| JP | 2012-517702 | 8/2012 |
| KR | 10-1113602 | 2/2012 |

OTHER PUBLICATIONS

European Office Action for European Application No. 18 828 691.8, dated Apr. 25, 2023.

* cited by examiner

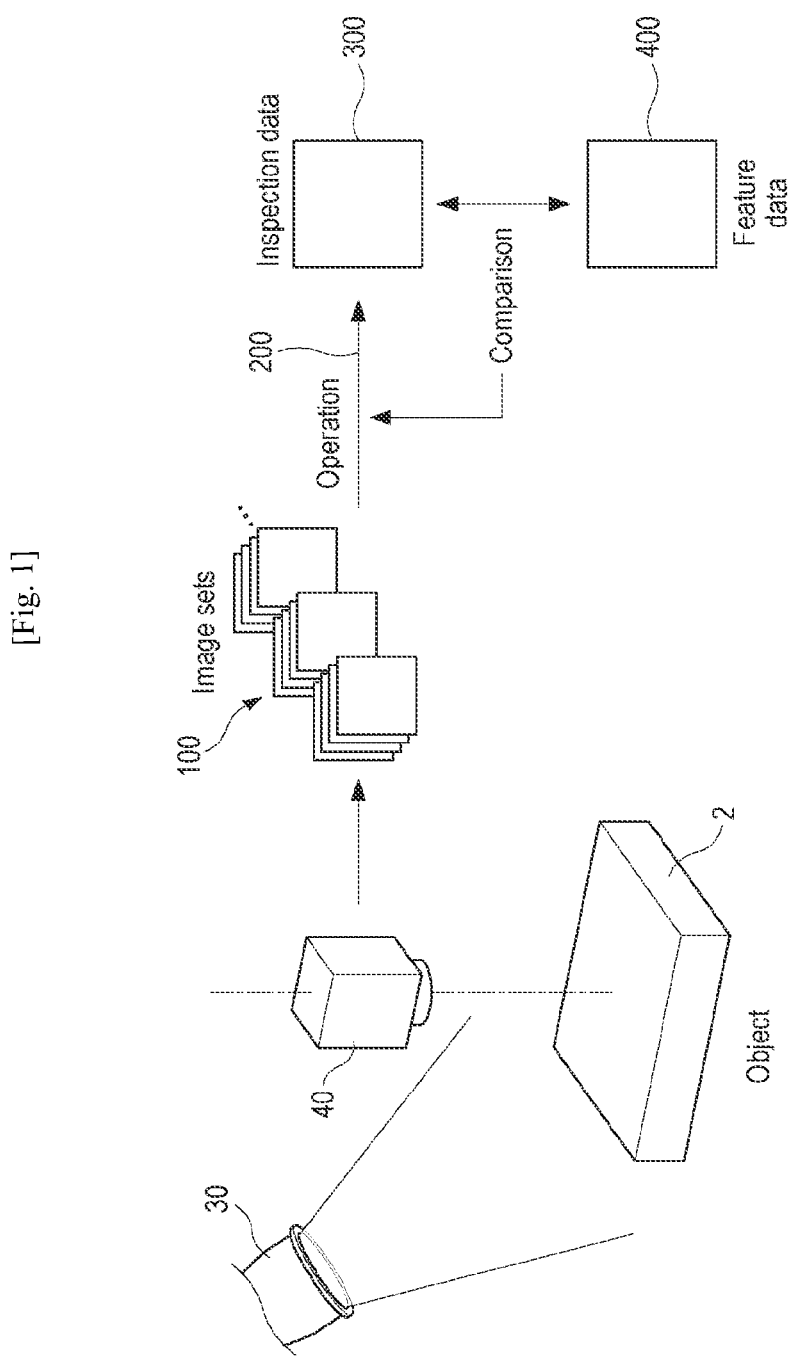

[Fig. 2]
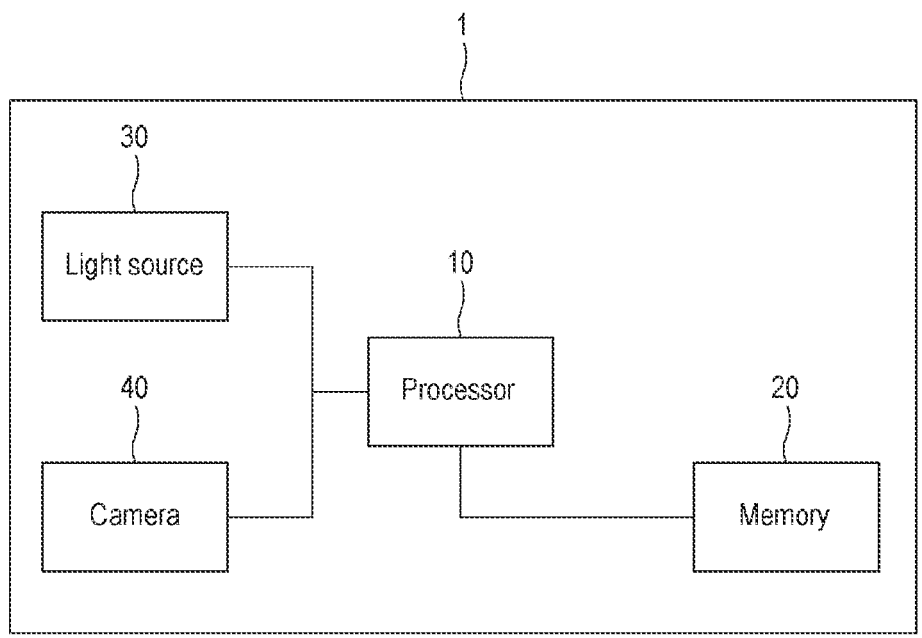
[Fig. 3]
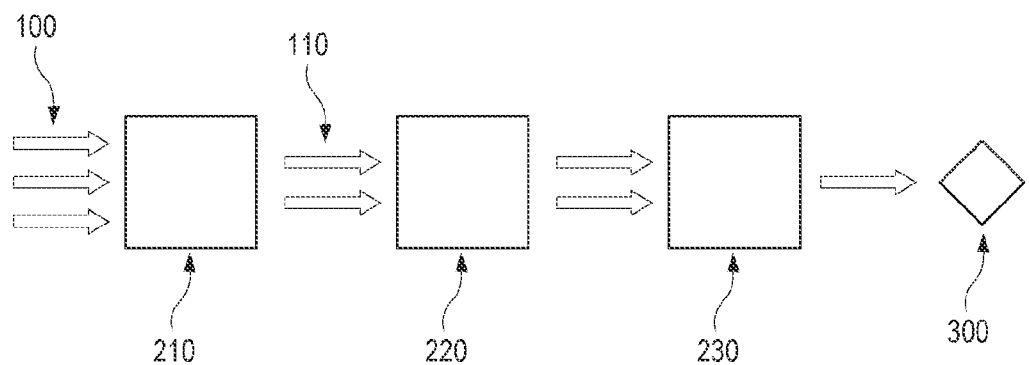

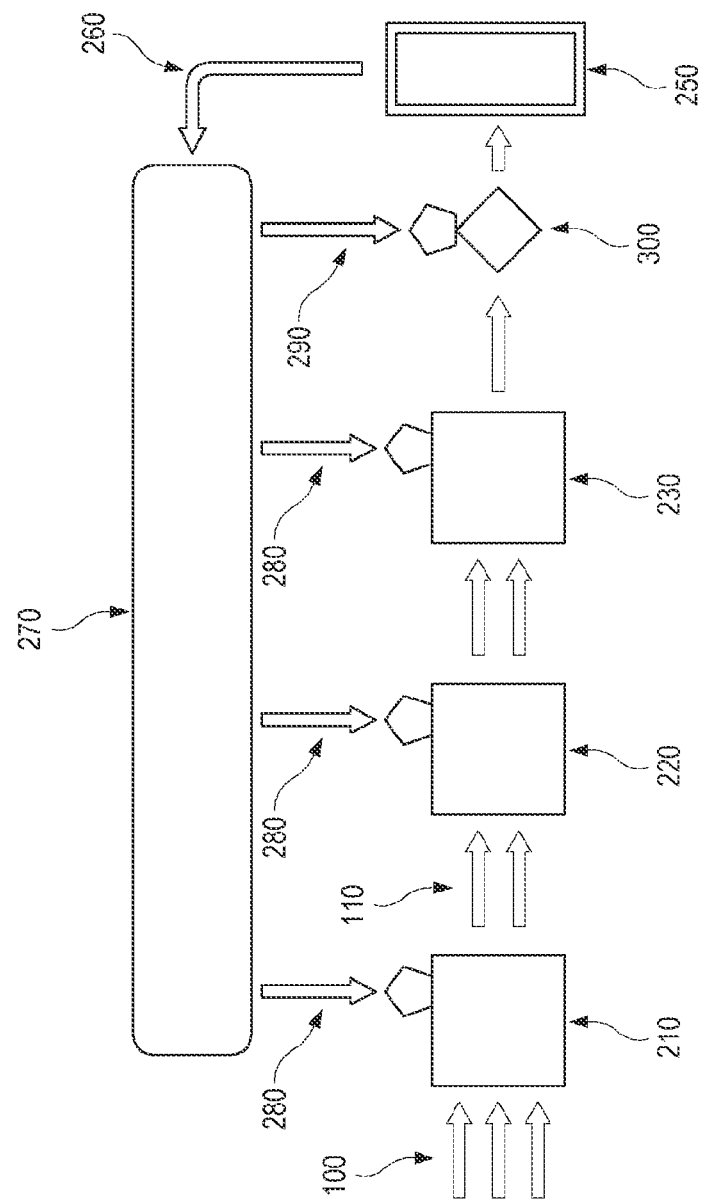

[Fig. 5]
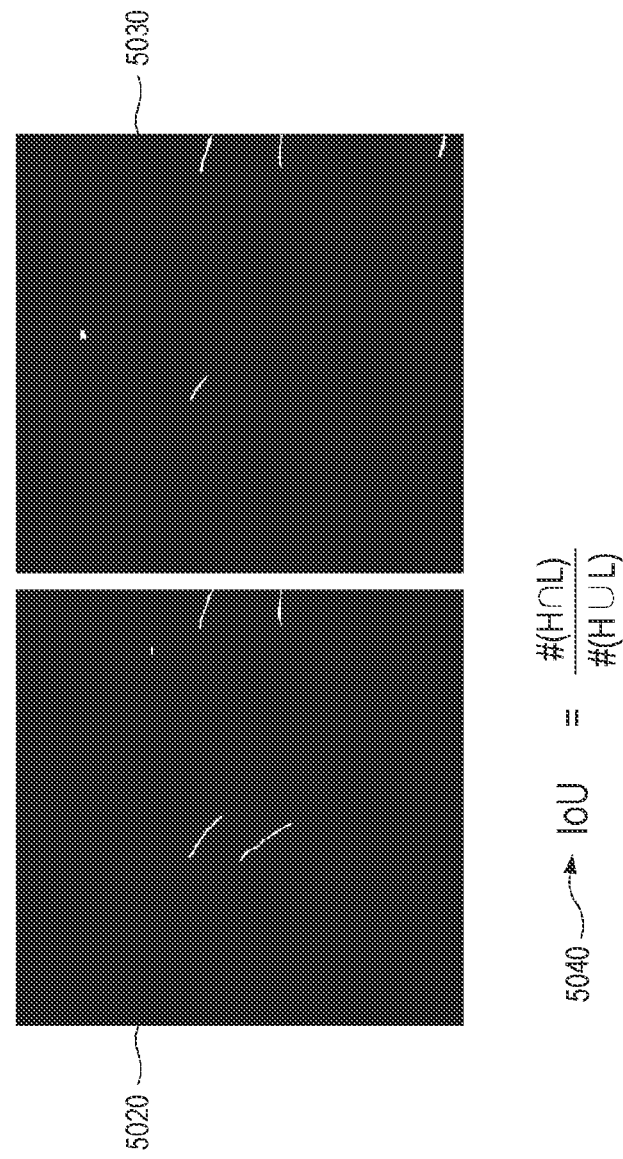
$$S = \frac{(TP+TN) - (FP+FN)}{TP+TN+FP+FN}$$
$$IoU = \frac{\#(H \cap L)}{\#(H \cup L)}$$

[Fig. 6]
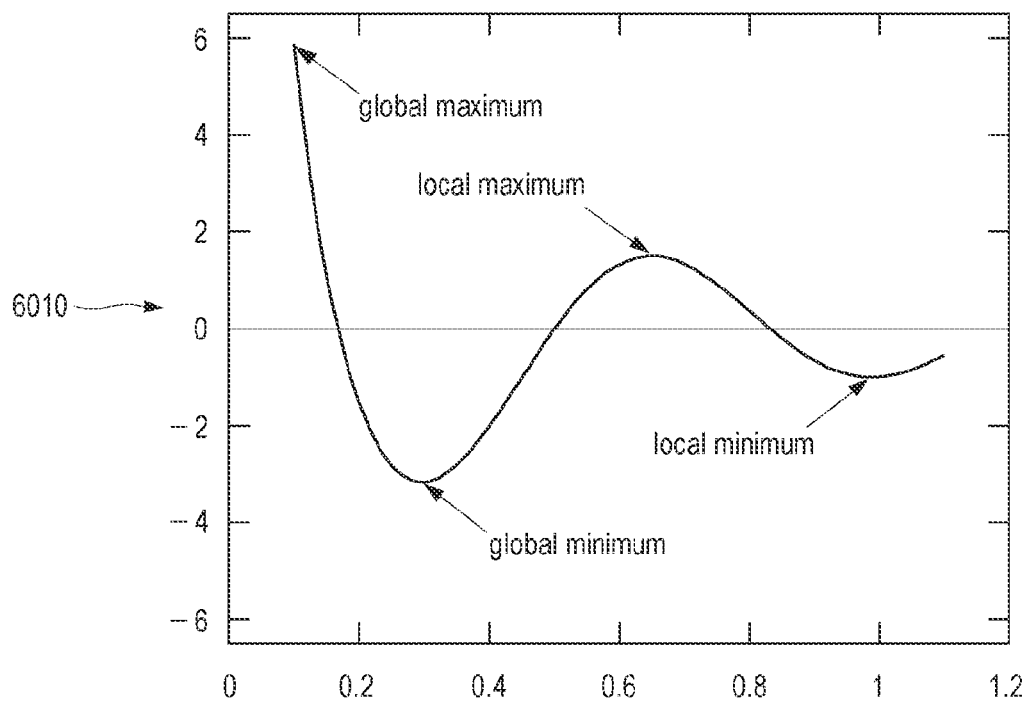
$$6020 \longrightarrow P(\Theta) = \frac{exp(-\beta E(\Theta))}{Z[\beta]} = \frac{exp(-\beta E(\Theta))}{\sum_{\omega \in \Omega} exp(-\beta E(\omega))}$$
$$6030 \longrightarrow P(accept\ transition\ from\ \Theta_0\ to\ \Theta_1) = exp(-\beta(E(\Theta_1) - E(\Theta_0)))$$

[Fig. 7]
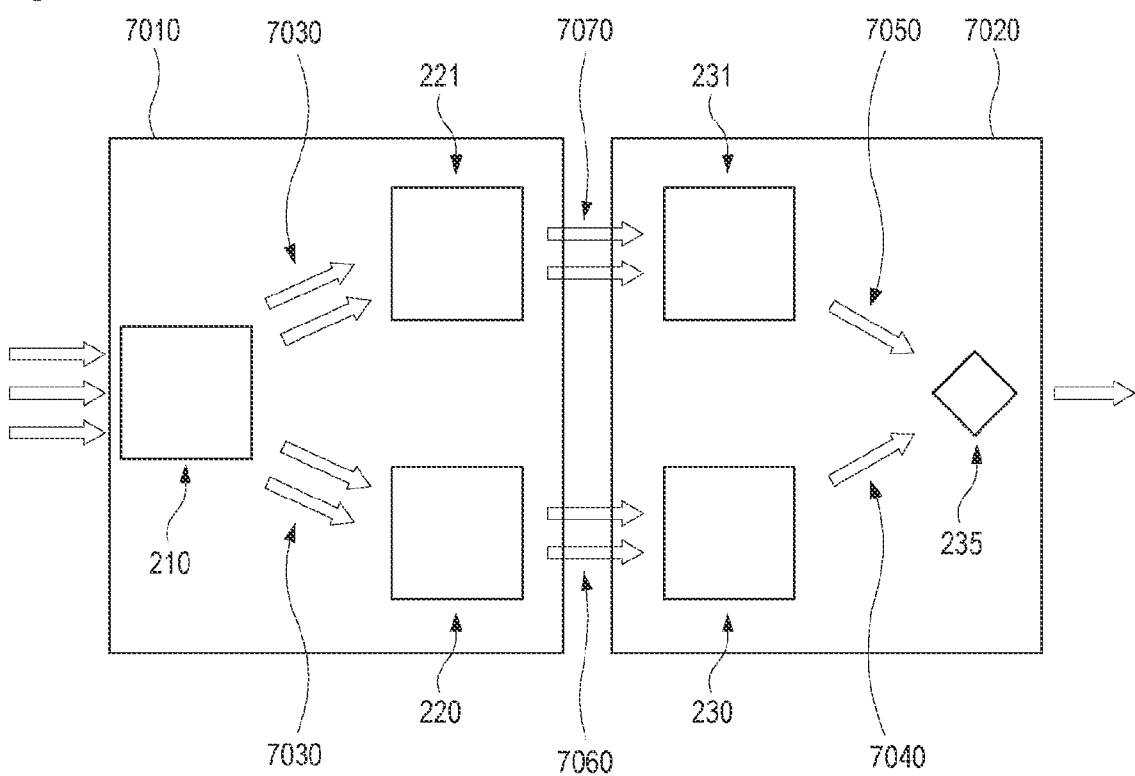

APPARATUS FOR OPTIMIZING INSPECTION OF EXTERIOR OF TARGET OBJECT AND METHOD THEREOF

CROSS REFERENCE TO RELATED APPLICATIONS

This application is a continuation application of U.S. patent application Ser. No. 16/629,143, filed Jan. 7, 2020 (now pending), the disclosure of which is herein incorporated by reference in its entirety. The U.S. patent application Ser. No. 16/629,143 is a national entry of International Application No. PCT/KR2018/007697, filed on Jul. 6, 2018, which claims priority to U.S. Provisional Patent Application No. 62/529,582 filed on Jul. 7, 2017, the entire contents of which are incorporated herein by reference.

TECHNICAL FIELD

This application is based upon and claims the benefit of priority from U.S. Provisional Patent Application No. 62/529,582, filed on Jul. 7, 2017 the entire contents of which are incorporated herein by reference.

The present disclosure relates to an apparatus for optimizing an operation for processing a plurality of image streams and a method thereof.

BACKGROUND ART

In connection with performing MOI (Mechanical Optical Inspection), it is possible to initially obtain an image of a target object, which is a subject of the MOI, and then to determine whether the target object conforms to the specification on the basis of the image. In other words, in the process of inspecting the target object, a diagnosis may be conducted, for example, in connection with whether the corresponding target object has a shape conforming to the specification and/or whether the surface of the target object has a defect.

However, it may be difficult to accurately specify a defect of the target object. To this end, various image processes or image processing techniques may be performed in connection with the image of the target object. There may be various types of image processes for sensing a defect, at least because there may be no clear definition of a defect of the target object, and there are various types of defects.

In order to sense various types of defects, a MOI operation may require an appropriate configuration. In other words, in connection with performing a MOI operation, configurations may be required in connection with at least one of the following examples: to what image, among images of the target object, image processes are to be applied; what kind of image process is to be included in the MOI operation; in what sequence respective image processes are to be applied to the image; and how parameter values used for respective image processes are to be selected.

Such a configuration process has a problem in that a significant amount of time may be required. Furthermore, according to this scheme, a configuration corresponding to a local maxima or local minima may be erroneously derived as the optimal configuration in the process of applying a certain configuration to the MOI operation.

DISCLOSURE OF INVENTION

Technical Problem

The present disclosure, in order to solve the above-mentioned problems of the related art, provides a technology that optimizes a process for processing one or more sets of images in order to inspect a defect of a target object.

Solution to Problem

According to one embodiment of the present disclosure, there is provided a technique that includes: at least one camera configured to capture one or more sets of images of the target object; a memory configured to store the one or more sets of images of the target object and feature data including one or more predetermined exterior features of the target object; and a processor configured to: obtain the one or more sets of images from the memory, each set of images being captured under one or more predetermined settings; determine a first process configuration for an operation including a plurality of image processes; perform the operation on the one or more sets of images under the first process configuration; generate inspection data on the exterior of the target object from the one or more sets of images that have been processed under the first process configuration; generate an inspection score by comparing the inspection data on the exterior of the target object with the feature data; compare the inspection score with a predetermined threshold score; set the first process configuration as an optimal configuration if the inspection score satisfies the predetermined threshold score; and determine a second process configuration for the operation if the inspection score does not satisfy the predetermined threshold score.

Specifically, the processor, when determining the first process configuration, is further configured to: determine a first set of images from the one or more sets of images, on which the operation under the first process configuration is performed; determine a first set of image processes from the plurality of image processes, which is performed in the operation under the first process configuration; determine first parameter values for the first set of image processes; and determine a first sequence of the first set of image processes.

Specifically, the processor, when generating the inspection score, is further configured to: obtain one or more flags from the inspection data, each of the one or more flags indicating whether the exterior of the target object includes at least one of the predetermined exterior features; determine whether each of the one or more flags is consistent with the feature data stored in the memory; and generate the inspection score that indicates a ratio of a number of flags that are consistent with the feature data to a total number of the one or more flags.

Specifically, the processor, when generating the inspection score, is further configured to: obtain a first area on the target object from the inspection data, the first area including at least one of the predetermined exterior features; obtain a second area on the target object from the feature data pre-stored in the memory, the second area including the at least one of the predetermined exterior features; determine an overlapping area between the first area and the second area; and generate the inspection score that indicates a proportion of the overlapping area in the second area.

Specifically, the processor, when determining the second process configuration, is further configured to determine a second set of images from the one or more sets of images, a second set of image processes from the plurality of image processes, second parameter values for the second set of image processes, and a second sequence of the second set of image processes, according to a difference between the inspection score and the predetermined threshold score.

Specifically, the processor, when determining the second process configuration, is further configured to: derive a difference between a previous inspection score, which has been generated using a previous process configuration for the operation before performing the operation under the first process configuration, and the inspection score generated using the first process configuration for the operation; and determine the second process configuration by modifying the first process configuration according to the derived difference.

Specifically, the processor is further configured to perform the operation under the second process configuration.

Specifically, an apparatus for optimizing an inspection of an exterior of a target object further comprises: a light source configured to irradiate light to the target object, wherein the one or more predetermined settings include at least one of a wavelength of the light irradiated to the target object, an irradiation angle of the light into the target object, an illumination of the light, and a type of the at least one camera.

Specifically, the first sequence includes a sub-sequence that applies at least two different image processes, among the first set of image processes, to the first set of images in parallel.

Specifically, the first sequence includes a sub-sequence that applies a single image process, among the first set of image processes, to the first set of images after applying the at least two different image processes to the first set of images in parallel.

According to one embodiment of the present disclosure, there is provided a technique that includes: capturing one or more sets of images of the target object, each set of images being captured under one or more predetermined settings; determining a first process configuration for an operation including a plurality of image processes; performing the operation on the one or more sets of images under the first process configuration; generating inspection data on the exterior of the target object from the one or more sets of images that have been processed under the first process configuration; generating an inspection score by comparing the inspection data on the exterior of the target object with feature data, the feature data being pre-stored in a memory and including one or more predetermined exterior features of the target object; comparing the inspection score with a predetermined threshold score; setting the first process configuration as an optimal configuration if the inspection score satisfies the predetermined threshold score; and determining a second process configuration for the operation if the inspection score does not satisfy the predetermined threshold score.

Specifically, the determining the first process configuration includes: determining a first set of images from the one or more sets of images, on which the operation under the first process configuration is performed; determining a first set of image processes from the plurality of image processes, which is performed in the operation under the first process configuration; determining first parameter values for the first set of image processes; and determining a first sequence of the first set of image processes.

Specifically, the generating the inspection score includes: obtaining one or more flags from the inspection data, each of the one or more flags indicating whether the exterior of the target object includes at least one of the predetermined exterior features; determining whether each of the one or more flags is consistent with the feature data pre-stored in the memory; and generating the inspection score that indicates a ratio of a number of flags that are consistent with the feature data to a total number of the one or more flags.

Specifically, the generating the inspection score includes: obtaining a first area on the target object from the inspection data, the first area including at least one of the predetermined exterior features; obtaining a second area on the target object from the feature data pre-stored in the memory, the second area including the at least one of the predetermined exterior features; determining an overlapping area between the first area and the second area; and generating the inspection score that indicates a proportion of the overlapping area in the second area.

Specifically, the determining the second process configuration for the operation includes determining a second set of images from the one or more sets of images, a second set of image processes from the plurality of image processes, second parameter values for the second set of image processes, and a second sequence of the second set of image processes, according to a difference between the inspection score and the pre-determined threshold score.

Specifically, the determining the second process configuration for the operation includes: deriving a difference between a previous inspection score, which has been generated using a previous process configuration for the operation before performing the operation under the first process configuration, and the inspection score generated using the first process configuration for the operation; and determining the second process configuration by modifying the first process configuration according to the derived difference.

Specifically, a method for optimizing an inspection of an exterior of a target object further comprises: performing the operation under the second process configuration.

Specifically, the one or more predetermined settings include at least one of a wavelength of light irradiated to the target object for capturing the one or more sets of images of the target object, an irradiation angle of the light into the target object, an illumination of the light, and a type of at least one camera configured to capture the one or more sets of images of the target object.

Specifically, the first sequence includes a sub-sequence that applies at least two different image processes, among the first set of image processes, to the first set of images in parallel.

Specifically, the first sequence includes a sub-sequence that applies a single image process, among the first set of image processes, to the first set of images after applying the at least two different image processes to the first set of images in parallel.

Advantageous Effects of Invention

According to various embodiments of the present disclosure, an electronic device can sense a defect of a target object accurately and efficiently by deriving an optimized configuration of an operation for inspecting a defect of the exterior of the target object.

According to various embodiments of the present disclosure, an electronic device can accurately derive an optimal configuration, not a configuration corresponding to a local maxima or local minima, in connection with optimization of an operation for inspecting a defect of a target object.

According to various embodiments of the present disclosure, an electronic device can derive an optimal configuration of a defect inspection operation according to an objective standard.

BRIEF DESCRIPTION OF DRAWINGS

FIG. 1 illustrates an overall operating process of an electronic device according to various embodiments of the present disclosure.

FIG. 2 illustrates a block diagram of an electronic device according to various embodiments of the present disclosure.

FIG. 3 illustrates an operation for processing an image according to an embodiment of the present disclosure.

FIG. 4 illustrates a process that optimizes an operation for processing an image according to an embodiment of the present disclosure.

FIG. 5 illustrates a method for evaluating inspection data by a processor according to an embodiment of the present disclosure.

FIG. 6 illustrates a method for determining a parameter value by a processor during a process of determining a new configuration of an operation according to an embodiment of the present disclosure.

FIG. 7 illustrates a branching sub-sequence and a merging sub-sequence according to an embedment of the present disclosure.

BEST MODE FOR CARRYING OUT THE INVENTION

Figure 8:
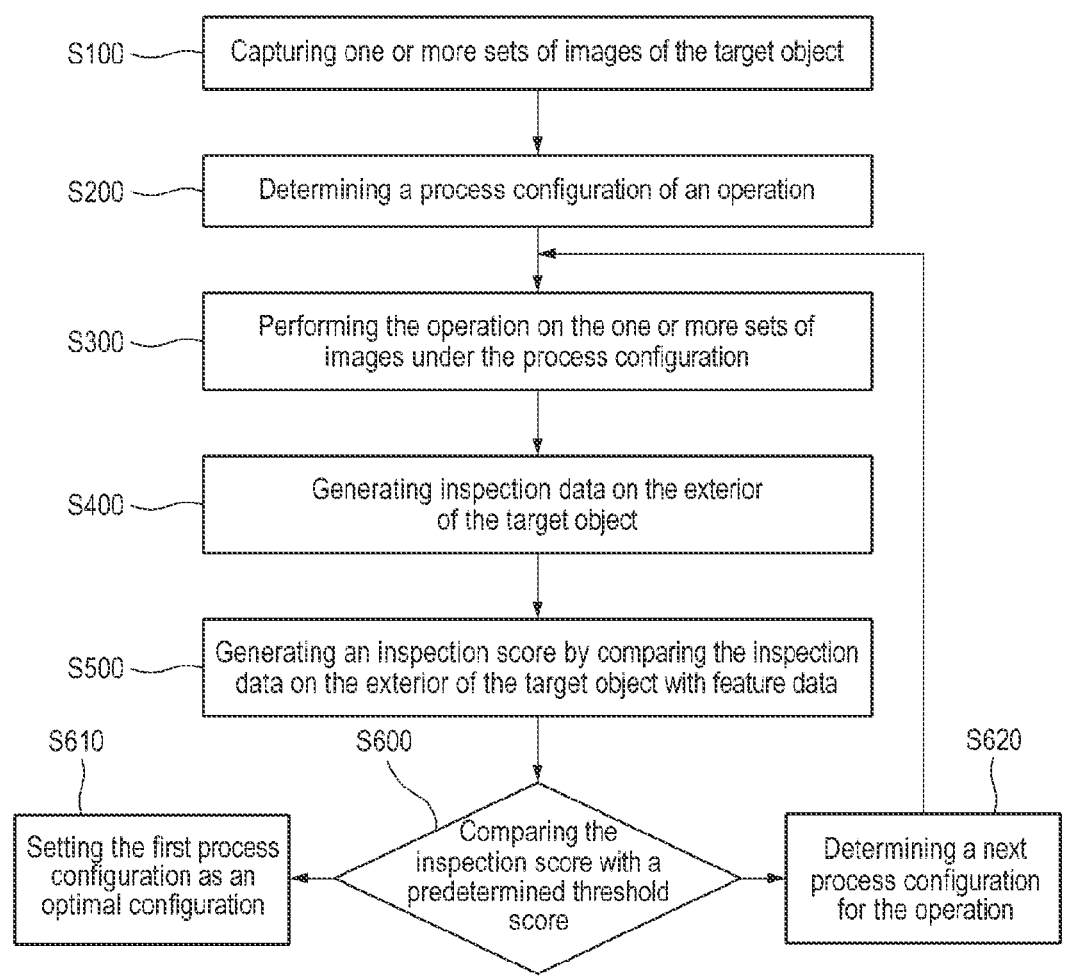
FIG. 8 illustrates an embodiment of an operation optimization method that may be performed by an electronic device according to the present disclosure.

Various embodiments disclosed in this document are illustrated for the purpose of clearly describing the technical idea of the present disclosure, and are not to be limited to a specific mode of embodiment. The technical idea of the present disclosure includes various modifications, equivalents, and alternatives of each embodiment, and a combination of embodiments selected from all or part of each embodiment. In addition, the scope of the technical idea of the present disclosure is not limited to the following various embodiments or specific descriptions thereof.

Terminology used in this document, including technical or scientific terms, may have meanings that are normally understood by a person skilled in the art to which the present disclosure pertains unless otherwise defined.

Expressions such as "include", "may include", "comprise", "may comprise", "have", and "may have" used in this document mean that a feature in question (for example, function, operation, or element) exists, and do not exclude the existence of another feature. That is, such expressions are to be understood as open-ended terms implying the possibility that another embodiment may be included.

Singular expressions used in this document may include plural meanings unless otherwise indicated in the context, and this applies to singular expressions used in the claims as well.

Expressions "first", "second", and the like in this document are used, in connection with denoting a plurality of entities of the same kind, to distinguish an entity from another entity, unless otherwise indicated in the context, and do not limit the order or importance between the entities in question.

Expressions "A, B, and C", "A, B, or C", "A, B, and/or C", "at least one of A, B, and C", "at least one of A, B, or C", "at least one of A, B, and/or C" and the like used in this document may denote respective enumerated items or all possible combinations of the enumerated items. For example, "at least one of A or B" may denote all of the following: (1) at least one A, (2) at least one B, and (3) at least one A and at least one B.

The expression "on the basis of" is used in this document to describe one or more factors that affect an action or operation of determination or decision described in the phrase or sentence including the expression, and this expression does not exclude additional factors that affect the action or operation of determination fir decision in question.

The expression that an element (for example, first element) is "connected" to a different element (for example, second element) used in this document may mean that the element is not only directly connected to the different element, but also connected via another different element (for example, third element).

The expression "configured to" used in this document may have, depending on the context, the meanings "set to", "able to", "modified to", "adapted to", "capable of", and the like. This expression is not limited to the meaning of "specially designed on a hardware basis", and a processor configured to perform a specific operation, for example, may denote a generic-purpose processor capable of performing the specific operation by executing software.

Hereinafter, various embodiments of the present disclosure will be described with reference to the accompanying drawings. In the accompanying drawings and descriptions thereof, the same or substantially equivalent elements may be given the same reference numerals. In the following description of various embodiments, furthermore, repeated descriptions of the same or corresponding elements may be omitted without meaning that the elements in question are not included in the corresponding embodiment.

FIG. 1 illustrates an overall operating process of an electronic device according to various embodiments of the present disclosure. An electronic device according to various embodiments of the present disclosure may perform optimization of an operation for processing a plurality of sets of images in order to inspect, a defect of the exterior of a target object. In some embodiments, the electronic device according to the present disclosure may inspect a defect of at least one target object that is given as a sample. Each of the at least one target object may or may not have a defect. Together with the at least one target object given as a sample, feature data 400 may be provided so as to confirm whether each target object actually has a defect and to indicate the actual location of the defect with regard to the corresponding target object. The feature data 400 may be genuine information regarding the actual defect of the corresponding target object and/or information to be compared with a result value obtained through a measurement. The electronic device according to the present disclosure may store the provided feature data.

An electronic device according to the present disclosure may obtain one or more sets of images 100. The electronic device may shed light to a target object 2 using a light source 30 (described later), and may capture reflected light using a camera 40 (described later). The electronic device may obtain one or more sets of images 100 regarding the target object using the captured light.

Thereafter, the electronic device according to the present disclosure may start an operation 200 for inspecting a defect of the target object. This operation may be an operation based on a certain configuration. The electronic device may select one or more sets of images from a plurality of sets of images according to the certain configuration, and may apply predetermined image processes to the selected sets of images in a predetermined sequence. The predetermined image processes may have parameter values based on a definition included in the certain configuration.

The electronic device according to the present disclosure may obtain inspection data 300 according to an operation based on a certain configuration. The inspection data 300 may be measurement data resulting from an inspection of a defect of the corresponding target object by the electronic device. The electronic device may compare the inspection data 300 with stored feature data 400 and may modify the configuration of the operation according to the result of comparison.

In one embodiment, the electronic device may automatically repeat application of the operation according to a certain configuration, evaluation of the operation according to the result of the corresponding operation, and modification of the operation configuration based on the evaluation result. If an appropriate configuration of the operation is derived during the repeated processes, the corresponding configuration may be determined as the optimized configuration of this operation, in this manner, the electronic device according to the present disclosure may optimize the operation for inspecting a defect of the target object. After the optimized configuration of the operation is determined, the electronic device may proceed to inspect defects of other target objects through an operation based on the optimized configuration.

According to various embodiments of the present disclosure, an electronic device may sense a defect of a target object accurately and efficiently by deriving an optimized configuration of an operation for inspecting a defect of the target object.

According to various embodiments of the present disclosure, an electronic device can accurately derive an optimal configuration, not a configuration corresponding to a local maxima or local minima, in connection with optimization of an operation for inspecting a defect of a target object.

According to various embodiments of the present disclosure, an electronic device can derive an optimal configuration of a defect inspection operation according to an objective standard.

FIG. 2 illustrates a block diagram of an electronic device 1 according to various embodiments of the present disclosure. The above-described electronic device according to the present disclosure may be represented by the illustrated electronic device 1.

According to an embodiment, the electronic device 1 may include a light source 30, a camera 40, a memory 20, and/or a processor 10. In some embodiments, at least one of the above elements of the electronic device 1 may be omitted, or another element may be added to the electronic device 1. In some embodiments, in addition or in alternative to the same, some elements may be integrated and implemented, or may be implemented as a single entity or a plurality of entities.

At least some elements among the elements inside/outside the electronic device 1 may be interconnected, for example, through a GPIO (general purpose input/output), a SPI (serial peripheral interface), and/or a MIPI (mobile industry processor interface) so as to exchange data and/or signals.

The light source 30 may irradiate light to the target object. The electronic device 1 may include at least one light source 30, and each of the at least one light source 30 may be configured variously. In an embodiment, the light source 30 may be omitted.

The camera 40 may capture one or more sets of images of the target object. The camera 40 may capture light irradiated by the light source 30 and then reflected from the target object 2, thereby obtaining an image of the target object 2. This image may be included in the one or more sets of images. The electronic device 1 may include at least one camera 40, and each of the at least one camera 40 may be configured variously.

The memory 20 may store various types of information necessary to drive the electronic device 1. Data stored in the memory 20 may data obtained, processed, or used by at least one element of the electronic device 1, and may include software (for example, programs). The memory 20 may include a volatile memory and/or a non-volatile memory. The memory 20 may store one or more sets of images of the target object. In addition, the memory 20 may store feature data regarding a defect part of the target object. The feature data may include information regarding one or more predetermined exterior features or exterior defects of the target object.

The processor 10 may drive software (for example, programs) so as to control at least one element of the electronic device 1 connected to the processor 10. In addition, the processor 10 may perform one or more various operations related to the present disclosure, such as calculation, processing, data generation, and modification. In addition, the processor 10 may load data from the memory 20 or store the same in the memory 20.

The processor 10 may obtain one or more sets of images 100 from the memory 20. Each of the sets of images may be one captured under one or more predetermined settings.

The processor 10 may determine a first configuration of an operation for processing one or more sets of images 100. The processor 10 may process one or more sets of images according to an operation based on the first configuration. The operation may include one or more image processes. The processor 10 may generate inspection data 300 regarding a defect of the target object from one or inure sets of images processed by the operation based on the first configuration.

The processor 10 may generate an inspection score by comparing inspection data 300 with feature data 400 obtained from the memory 20. The inspection score may be generated by evaluating the degree of efficiency to which the operation senses a defect of the target object according to the first configuration, and then providing a numerical value that represents the result of evaluation.

The processor 10 may compare the inspection score with a predetermined threshold score. Depending on the comparison result, the processor 10 may determine the first configuration as the optimal configuration or may newly determine a second configuration. When the inspection score derived according to the first configuration satisfies the predetermined threshold score, the processor 10 may determine the first configuration as the optimal configuration. In this case, the processor 10 may store the first configuration in the memory according to an embodiment. In addition, when the inspection score derived according to the first configuration fails to satisfy the predetermined threshold score, the processor 10 may determine a second configuration of an operation for processing one or more sets of images. The operation based on the second configuration may be performed after the operation based on the first configuration. The processor 10 may keep performing the operation with regard to the one or more sets of images while changing the configuration of the operation until the optimal configuration is derived. In an embodiment, the fact that the inspection score satisfies the threshold score may mean that the value of the inspection score is higher than the threshold score. In an embodiment, the fact that the inspection score satisfies the threshold score may mean that the value of the inspection score is lower than the threshold score. In an embodiment, the fact that the inspection score satisfies the threshold score may mean that the value of the inspection score exists within a predetermined percentage range of the predetermined threshold score.

In the present disclosure, the target object 2 may be various objects that are subject to a MOI. The target object 2 may, for example, be a semiconductor, a semiconductor substrate, and/or a die mounted on the semiconductor substrate. The target object in the present disclosure is not limited to the above-mentioned objects.

In the present disclosure, a defect may refer to a characteristic part of a target object, which can be found from the surface or interior of the target object. In an embodiment, the defect may refer to a difference in the surface or interior a target object compared with a specification of the target object. In an embodiment, the defect may be a stain in a specific color appearing on the colorless surface of the target object. In an embodiment, the defect may be a scratch on the surface of the target object. In an embodiment, the defect may be a dent or a bulge on the target object. In an embodiment, the defect may be a feature intentionally generated on the target object according to a machining process. In the present disclosure, the defect may also be referred to as, for example, a feature, an anomaly, and/or an imperfection.

In the present disclosure, an image of the target object 2 may be obtained by taking an image of the target object 2. Light irradiated toward the target object by the light source 30 may be reflected from the target object 2, and an image generated by capturing the reflected light by the camera 40 may be the image of the target object 2. In an embodiment, the image may be obtained by taking an image of a partial area or ROI (Region Of interest) of the target object 2. There may be an image for each view based on each FOV (Field Of View) of the target object 2.

In the present disclosure, a set of images may be a set of images of the target object taken under a predetermined setting. For example, images of the target object taken under a certain setting may be included in a single set of images. As used herein, the predetermined setting may refer to a set of values configured with regard to all factors related to taking images of the target object. The factors may include, for example, the type, amount, and arrangement of the light source 30, the type, amount, and arrangement of the camera 40, parameters related to the light source 30, parameters related to the camera 40, the wavelength of light, the illumination of light, the angle at which light is irradiated to the target object and any combinations thereof.

In the present disclosure, an operation may refer to a series of processes for processing a set of images of the target object and sensing a defect of the target object from the set of images, in order to inspect a defect of the target object. The operation may be for the processor to apply at least one set of image processes to predetermined sets of images, among one or more sets of images, according to a predetermined sequence. The content of the operation may vary depending on how the operation is configured. As described above, the configuration of the operation may include configurations regarding, for example, how to determine a set of images to which the operation is to be applied; how to determine a set of image processes included in the operation, among a plurality of image processes; how to determine values of parameters used for the set of image processes; and in what sequence the image processes of the set of image processes are to be applied. In the present disclosure, the configuration may also be referred to as a process configuration.

In the present disclosure, an image process may be a concept encompassing all image processing applied to images of a target object in order to inspect a defect of the target object. The concept of the image process may include, for example, data processing, an image processing algorithm, and/or a data processing algorithm. At least one image process may belong to the operation. The type of image processes will be described later.

In the present disclosure, inspection data may refer to a result of measurement regarding a defect of a target object, inspected by applying an operation to an image of the target object. The inspection data may be a result obtained by processing one or more sets of images according to an operation based on a certain configuration by the processor 10. The inspection data may include a flag. The flag of the inspection data may indicate whether a defect exists on the corresponding target object. In an embodiment, the flag may be a binary indicator. In an embodiment, the inspection data may include a feature location image. The feature location image of the inspection data may indicate an area of a target object that is occupied by a defect existing on the corresponding target object. In an embodiment, the feature location image may be represented in a heat-map image type, which is similar to the above-mentioned target object image. In an embodiment, the feature location image may be referred to as a spatial location map. The inspection data is obtained by applying an operation to one or more sets of images, and thus may include a plurality of flags and/or a plurality of feature location images, depending on continuous image inputs.

In the present disclosure, the feature data 400 may include information regarding an actual defect of the target object. The feature data 400 may be provided together with a target object, which is given as a sample, and may include genuine information regarding a defect existing on the target object. The feature data may include information regarding whether the corresponding target object has a defect and information regarding the location of the defect on the target object. The location information may indicate the area on the surface of the target object in which the defect exists. In an embodiment, the feature data 400 may be information generated by a human after visually inspecting the target object 2 or information generated by equipment such as a computer.

In the present disclosure, an inspection score may be data indicating, by a numerical value, how accurately inspection data has sensed a defect of the target object, the inspection data being derived when an operation based on a certain configuration is performed with regard to one or more sets of images. The inspection score may be obtained by comparing inspection data derived according to an operation based on a certain configuration and feature data that was stored in advance. When the inspection data derived according to an operation based on a certain configuration is a flag, the inspection score may be represented by a ratio of the number of flags that are consistent with the content of the feature data to the number of one or more flags of the inspection data. When the inspection data derived according to an operation based on a certain configuration is a feature location image, in an embodiment, the operation may first determine an overlapping area between an area in which a defect indicated by the feature location image of the inspection data exists and an area in which a defect indicated by the feature data exists. The inspection score may then be represented by a proportion of the overlapping area to the area in which the defect indicated by the feature data exists. This proportion, numerical value data, may be used to determine the accuracy of the operation based on the certain configuration in question. The inspection score may also be referred to as, for example, evaluation data and/or a score.

In this disclosure, a predetermined threshold score, which is compared with the inspection score, may be a reference value for determining a certain configuration of an operation as the optimal configuration. As described above, when an inspection score obtained by an operation based on a certain configuration satisfies the predetermined threshold score, the corresponding certain configuration may be determined as the optimal configuration. The predetermined threshold score may be appropriately determined according to a desired degree of optimization of the operation.

In the present disclosure, a program refers to software stored in the memory 20, and may include an operating system for controlling resources of the electronic device 1, applications, and/or middleware that provides the applications with various functions such that the applications can utilize the resources of the electronic device 1.

In the present disclosure, the electronic device 1 may be various types of devices. For example, the electronic device may be a portable communication device, a computer device, a portable multimedia device, a wearable device, or a device based on a combination of one or more of the above-mentioned devices. The electronic device according to the present disclosure is not limited to the above-mentioned devices. The electronic device 1 may also be simply referred to as a device.

In an embodiment, the electronic device 1 may include a plurality of light sources 30. Each of the plurality of light sources 30 may be configured differently. In an embodiment, the light sources 30 may be two-dimensional light sources that irradiate RGB (Red, Green, Blue) light or three-dimensional light sources that irradiate pattern light. In an embodiment, each of the plurality of light sources 30 may be positioned on a normal line of the target object 2 so as to irradiate light perpendicularly on the target object 2, or may be positioned at a point inclined by a predetermined angle from the normal line of the target object 2 so as to obliquely irradiate light on the target object 2. The angle of light irradiated to the target object 2 may differ depending on the arrangement of each of the plurality of light sources 30. In an embodiment, light irradiated by each of the plurality of light sources 30 may have a different wavelength. In an embodiment, light irradiated by each of the plurality of light sources 30 may have a different illumination.

In an embodiment, the electronic device 1 may include a plurality of cameras 40. Each of the plurality of cameras 40 may be configured differently. In an embodiment, each of the plurality of cameras 40 may have a different type. For example, one or inure of the cameras 40 may be an image sensor such as a CCD (Charged Coupled Device) and a CMOS (Complementary Metal-Oxide-Semiconductor). In an embodiment, each of the plurality of cameras 40 may be arranged in various types near the target object to be able to capture light reflected from the target object.

In an embodiment, the memory 20 may store a plurality of image processes that may be applied to one or more sets of images.

In an embodiment, the processor 10 may determine, in order to determine a first configuration of an operation, a first set of images to which the operation based on the first configuration is to be applied, from one or more sets of images.

In an embodiment, the processor 10 may determine, in order to determine a first configuration of an operation, a first set of images included in the operation based on the first configuration, from a plurality of image processes.

In an embodiment, the processor 10 may determine, in order to determine a first configuration of an operation, first parameter values of one or more parameters of image processes included in the determined first set of image processes.

In an embodiment, the processor 10 may determine, in order to determine a first configuration of an operation, a first sequence in which image processes included in the determined first set of image processes are applied to the first set of images during the operation.

In an embodiment, the processor 10 may process a plurality of sets of images according to the first configuration of the operation. Specifically, the processor 10 may apply a first set of image processes, which have first parameter values as parameters, according to the first sequence, thereby processing the first set of images.

In an embodiment, the processor 10 may obtain one or more flags from the inspection data in order to compare the feature data with the inspection data and to generate an inspection score. Each of the one or more flags may indicate whether the exterior of the target object has a predetermined exterior feature or exterior defect. The processor 10 may determine whether each of the one or more flags is consistent with information regarding a defect, which is indicated by feature data pre-stored in the memory. To this end, the processor 10 may compare the feature data with each of the one or more flags. The processor 10 may generate an inspection store that indicates the ratio of the number of flags that are consistent with the feature data to the number of flags inside the inspection data.

In an embodiment, the processor 10 may obtain a feature location image from the inspection data, in order to compare the feature data with the inspection data and to generate an inspection score. The feature location image may have information regarding a first area, and the first area may include at least one predetermined exterior feature or exterior defect on the exterior of the target object. In addition, the processor 10 may obtain a second area from feature data pre-stored in the memory. The second area may include at least one predetermined exterior feature or exterior defect. That is, the first area may be a defect area appearing as a result of inspection or measurement according to the operation, and the second area may be an actual defect area of a target object sample pre-stored in the memory. The processor 10 may derive an overlapping area between the first area and the second area. The processor 10 may generate an inspection score that indicates the proportion of the overlapping area to the second area in which a defect indicated by the feature data exists.

In an embodiment, the processor 10 may determine the second configuration of the operation by comparing the inspection score, which is derived according to the first configuration of the operation, with the above-mentioned predetermined threshold score. In an embodiment, the processor 10 may determine the second configuration of the operation on the basis of a difference between the inspection score based on the first configuration and the above-mentioned predetermined threshold score. Specifically, on the basis of the above-mentioned difference, the processor 10 may determine a second set of images to which the operation based on the second configuration is applied, from a plurality of sets of images; the processor 10 may determine a second set of image processes included in the operation based on the second configuration, from a plurality of image processes; the processor 10 may determine second parameter values of parameters of the second set of image processes; and the processor 10 may determine a second sequence in which the second set of image processes are applied. As used herein, the second configuration may refer to a configuration applied to an operation for processing a plurality of sets of images, following the operation based on the first configuration.

In an embodiment, in connection with determining the second configuration of the operation, the processor 10 may modify the first configuration based on how the inspection score changes as the configuration of the operation is changed, thereby determining the second configuration. The processor 10 may initially apply an operation based on a certain configuration to a plurality of sets of images, thereby deriving an inspection score. Following the operation based on the certain configuration, the processor 10 may apply the operation based on the first configuration to the plurality of sets of images.

The processor 10 may derive an inspection score based on the first configuration, and may compare the same with an inspection score based on a certain configuration applied prior to the first configuration. The processor 10 may measure how the inspection score changes in this comparison process and may modify the first configuration on the basis of the change of the inspection score, thereby determining the second configuration. The change of the inspection score may include a difference between the two inspection scores.

In an embodiment, in connection with determining the second configuration of the operation, the processor 10 may determine details of the second configuration in various methods on the basis of the first configuration used prior to the second configuration. For example, the processor 10 may determine a set of images, a set of image processes, parameter values, and/or a sequence of the set of image processes that are used for the second configuration, in various methods. To this end, methods such as trial and error manner, gradient ascent/descent, annealing, and/or Gibbs measure may be used. These methods will be described later.

In an embodiment, the processor 10 may perform the operation based on the second configuration, which is determined based on the inspection score of the first configuration. That is, the processor 10 may apply a second set of image processes, which have a second parameter value as a parameter, according to the second sequence, thereby processing the second set of images.

In an embodiment, the processor 10 may repeatedly perform the task of determining a configuration to be used for the next operation based on the inspection score of the previous configuration. This repeated task may continue until a configuration is determined as the optimal configuration according to the above-mentioned process.

In an embodiment, a sequence of an operation based on a certain configuration may include at least one sub-sequence. A predetermined set of images during an operation may undergo a plurality of image processes. In this case, the predetermined set of images may undergo each of the plurality of image processes according to the sequence. In an embodiment, a set of images may undergo the plurality of image processes in a parallel manner during an intermediate step of the operation; the portion of the sequence that branches as described above may be referred to as a branching sub-sequence. In an embodiment, a set of images that have undergone the image processes in a parallel manner may undergo a single image process; the portion of the sequence that merges as described above may be referred to as a merging sub-sequence.

In an embodiment, the electronic device 1 may further include a communication interface (not illustrated in FIG. 2). The communication interface may perform wired or wireless communication between the electronic device 1 and the server or between the electronic device 1 and a different external electronic device. For example, the communication interface may perform wireless communication according to a scheme such as LTE (long-term evolution), LTE-A (LTE Advance), CDMA (code division multiple access), WCDMA (wideband CDMA), WiBro (Wireless Broadband), WiFi (wireless fidelity), Bluetooth, NFC (near field communication), GPS (Global Positioning System), or GNSS (global navigation satellite system). For example, the communication interface may perform wired communication according to a scheme such as USB (universal serial bus), HDMI (high definition multimedia interface), RS-232 (recommended standard 232), or POTS (plain old telephone service).

In an embodiment, the processor 10 may control the communication interface so as to obtain information from the server. The information obtained from the server may be stored in the memory 20. In an embodiment, the information obtained from the server may include, for example, the above-mentioned feature data, the above-mentioned plurality of image processes, and/or the above-mentioned one or more sets of images.

In an embodiment, the above-mentioned operation optimization process may be performed in a parallel manner by a plurality of electronic devices. Specifically, the process of evaluating the configuration of the operation and determining the next configuration of the operation, by the processor 10, may be performed in a parallel manner by a plurality of electronic devices, in order to utilize the computing power of the plurality of electronic devices. This may enable the process of deriving the optimal configuration of the operation to proceed in a rapid manner. The result of the optimization process performed in a parallel manner may be aggregated and processed by a single electronic device, and may be used to derive the optimal configuration regarding the operation. In an embodiment, the operation optimization process performed in a parallel manner may be performed by a plurality of electronic devices installed remotely. That is, the operation optimization process performed in a parallel manner may be performed by cloud computing.

In an embodiment, the above-mentioned operation optimization process may be performed by the processor 10 inside the electronic device 1, in order to improve or guarantee data security.

In an embodiment, the processor 10 may control the light source 30 and/or the camera 40 on the basis of the inspection data and/or the inspection score.

In an embodiment, when the processor 10 has repeated the task for determining the optimal configuration of the operation by a predetermined number of times, but has failed to derive a configuration deemed to be the optimal configuration, the processor 10 may control the light source 30 and/or the camera 40 so as to obtain an additional set of images.

In an embodiment, when the processor 10 needs predetermined linage data in the process of determining the detail of the next configuration of the operation, the processor 10 may control the light source 30 and/or the camera 40 so as to obtain the necessary image.

In an embodiment, the processor 10 may control the light source 30 and/or the camera 40 so as to change, for example, the arrangement of the light source 30, the arrangement of the camera 40, parameters related to the light source 30, parameters related to the camera 40, the wavelength of light, the illumination of light, and/or the angle at which light is irradiated to the target object.

In an embodiment, the electronic device 1 may further include an input device (not illustrated in FIG. 2). The input device may be a device for receiving data to be transferred to at least one element of the electronic device 1 from the outside. For example, the input device may include a mouse, a keyboard, and/or a touch pad.

In an embodiment, the electronic device 1 may further include an output device (not illustrated in FIG. 2). The output device may be a device for providing the user with various types of data, such as the result of inspection by the electronic device 1 and the operating condition thereof, in a visual type. For example, the output device may include a display, a projector, and/or a hologram.

In an embodiment, a plurality of different operations may be used. It may be necessary to apply different operations, in order to sense a defect from taken images of respective parts of the target object, according to features of respective parts of the target object. In this case, operations applied to images of respective parts of the target object may need to have different configurations. Accordingly, the electronic device 1 may perform an optimization process independently, according to images of respective pails of the target object. In an embodiment, a separate operation or a separate configuration may be applied with regard to each ROI of the target object. The electronic device 1 may accordingly perform an optimization process independently with regard to each ROI. In an embodiment, an operation having the optimal performance may be selected from operations that have undergone respective optimization processes.

In an embodiment, the electronic device 1 may be implemented by a digital computer system.

In an embodiment, the processor 10 may derive the optimal configuration according to a gradient descent method (described later).

In an embodiment, the processor 10 may derive the optimal configuration according to a simulated annealing method (described later).

In an embodiment, at least part of the calculation performed by the processor 10 may be performed by a GPU (Graphical Processing Unit). That is, the processor 10 may be at least partially or entirely implemented by a GPU.

Various embodiments of the electronic device 1 according to the present disclosure may be combined with one another. Respective embodiments may be combined in any permutation, and any embodiment of the electronic device 1 made by such a combination also belongs to the scope of the present disclosure. In addition, the internal/external elements of the electronic device 1 according to the present disclosure disclosed above, may be added, modified, respaced, or deleted according to the embodiment. In addition, the internal/external elements of the electronic device 1 disclosed above, may be implemented as hardware components.

FIG. 3 illustrates an operation for processing an image according to an embodiment of the present disclosure. As described above, an operation may refer to a process of processing a set of images of a target object, in order to inspect a defect of the target object, and obtaining measurement data (that is, inspection data) regarding the defect. In the illustrated embodiment, the operation according to the present disclosure may refer to an operation based on a predetermined configuration. According to this configuration, the operation may include predetermined image processes 210, 220, and 230 to be applied to a plurality of sets of images 100.

Initially, the processor 10 may obtain a plurality of sets of images 100. The processor 10 may successively apply an image process of an operation based on a predetermined configuration to the plurality of sets of images. In this predetermined configuration, the operation may include three image processes 210, 220, and 230. In an embodiment, the image process 210 may correspond to a selection process for selecting a predetermined set of images to which the operation based on the corresponding configuration is to be applied, among the plurality of sets of images 100. The selection process may select a predetermined set of images 110 from the plurality of sets of images 100 that have been input, according to the corresponding configuration of the operation, and may output the selected set of images.

The processor 10 may successively apply the next image processes 220 and 230 to the predetermined set of images 110 that have been output, thereby processing the set of images. In an embodiment, as illustrated, the number of sets of images may be reduced as the sets of images are processed according to respective image processes. Image processes used in this operation may be those selected from a plurality of image processes according to the above-mentioned predetermined configuration. In addition, the sequence of application of the image processes used in this operation may be determined according to the above-mentioned predetermined configuration.

The processor 10 may extract inspection data 300 from the sets of images that have undergone respective image processes of the operation. The inspection data 300 may be information regarding a defect of the target object obtained from sets of images of the target object, as mentioned above.

In the illustrated embodiment, the processor 10 may not evaluate whether the inspection data is accurately describing the defect of the target object, or may not modify the configuration of the illustrated operation according to the result of evaluation. In such an embodiment, for example, a person may compare the inspection data with the feature data so as to evaluate the accuracy of the inspection data.

FIG. 4 illustrates a process that optimizes an operation for processing an image according to an embodiment of the present disclosure. As described above, the electronic device 1 or processor 10 according to the present disclosure may optimize an operation for inspecting a defect of a target object. For the purpose of the optimization process, the processor 10 may perform a task of finding the optimal configuration while changing the configuration of the operation for processing a set of images of the target object. The illustrated embodiment has additional operations 250, 260, 270, and 280 for optimizing the configuration of the operation, compared with the above-described embodiment.

The processor 10 may evaluate 250 inspection data 300 resulting from the operation based on the current configuration. The processor 10 may compare the inspection data 300 with feature data 400 in this evaluation process 250. According to the result of comparison, the processor 10 may generate an inspection score 500 that indicates the accuracy of the inspection data 300.

The inspection score 500 may be a numerical representation of how accurately the operation based on the current configuration senses a defect of the target object. As mentioned above, when the inspection data 300 is a flag that indicates whether the target object has a defect, the processor 10 may determine, as the inspection score, the ratio of the number of flags that identically indicate whether the target object has a defect as the feature data, to the number of the flags of the inspection data. As described above, when the inspection data 300 is a feature location image, the processor 10 may determine, as the inspection score, the ratio of an overlapping area in which a defect indicated by the feature data exists to an area of the feature location image.

The processor 10 may compare the inspection score 500 with a predetermined threshold score that has been defined in advance and may determine, according to the result of comparison, whether to store the current configuration in the memory 20 or to determine 260 a new configuration. The inspection data evaluation process 250 by the processor 10 may be performed by an evaluator module. As used herein, a "module" may refer to a logic, a logical block, a component, or a circuit implemented as software or firmware. The module may constitute an integrally configured component, a smallest unit that performs one or more functions, or a part thereof. For example, the module may be configured by an ASIC (application-specific integrated circuit). In an embodiment, the operation of the evaluator module may be performed by the above-mentioned processor 10.

The processor 10 may determine 270 a configuration (for example, second configuration) of an operation to be applied after the current configuration (for example, first configuration) on the basis of various data. For example, the processor 10 may determine the next configuration of the operation in view of the inspection score based on the current configuration and/or the tendency of change of the inspection score based on configurations.

As described above, determining a configuration of an operation by the processor 10 may include the following: determining (selecting) a set of images (for example, second set of images), to which the operation based on the configuration in question is to be applied, from a plurality of sets of images; determining (selecting) a set of image processes (for example, second set of image processes), which are to be applied to the set of images, from a plurality of image processes: determining a sequence (for example, second sequence) to be applied to the determined set of image processes and deter a parameter value (for example, second parameter value) to be used for the determined set of image processes.

The processor 10 may apply 280 the operation to a plurality of sets of images 100 according to the determined next configuration (for example, second configuration). That is, the processor 10 may apply a second set of image processes, which have a second parameter value as a parameter, to the second set of images according to the second sequence. With reference to inspection data obtained from the operation based on the next configuration (for example, second configuration), the processor 10 may determine whether to store the next configuration (for example, second configuration) as the optimal configuration again or to determine a new configuration (for example, third configuration).

The process 270 of optimizing the operation configuration by the processor 10 may be performed by an optimizer module. Modules have been described above. In an embodiment, the operation by the optimizer module may be performed by the above-mentioned processor 10.

In an embodiment, the processor 10 may also change 290 the manner of calculating inspection data 300 according to the operation configuration. For example, the processor 10 may assign a separate weight in connection with calculating the inspection score according to the definition made by the operation configuration, may exclude specific data when calculating the inspection score, or may employ a different standard when comparing feature data and inspection data.

In an embodiment, each image process may also be implemented by a hardware component such as FPGA (Field Programmable Gate Arrays). In an embodiment, each image process may also be performed by a separate independent electronic device (for example, computer). In an embodiment, sets of images before/after processing by each image process may be transferred between separate electronic devices that perform each image process in various types (for example, Ethernet or WiFi). In an embodiment, respective elements (for example, image process, evaluation process 250, and/or optimization process 270) of the operation may be implemented by a remote server, and may communicate with each other by a type such as the Internet. An optimal configuration may be selected from configurations derived according to the optimization process performed by each electronic device, and this optimal configuration may be used as the initial value of the next optimization process.

In an embodiment, each image process may be various image processing and/or data selection processing. For example, each image process may be one of or any combination of the followings: data selection operators, a morphological operator, elementwise lookup tables, convolutional operators, histogram calculation and back-projection operators, highpass/lowpass/bandpass filters, threshold operators, noise reduction algorithms, complex operators, pixel level classifiers, blob detection, labeling algorithms, contour detection, shape estimation algorithms, and/or pixelwise arithmetic operators. The image process according to the present disclosure is not limited to the above-mentioned image processes.

The data selection operator may constitute an image process for selecting predetermined images from a plurality of images. The data selection operator may correspond to the above-mentioned selection process. In an embodiment, the data selection operator may select a predetermined set of images from a plurality of sets of images. Assuming a container having a plurality of taken images of an area of a target object, the data selection operator may select a predetermined subset of images from the container and may return the selected subset to the container. In an embodiment, this container may include a plurality of images of the target object obtained under various settings. This container may correspond to the above-mentioned memory 20. In an embodiment, the data selection operator may include at least one parameter. Each parameter may be used to determine which image is to be selected from inputted images. In an embodiment, this parameter may be a binary parameter. In an embodiment, the data selection operator may apply additional processing to an inputted set of images, in order to reduce the outputted set of images. For example, the data selection operator may derive a weighted mean of the inputted set of images and may output the derived mean value. For example, the data selection operator may have a set of floating point-type parameters, in order to indicate a weight necessary for combination of images on the basis of the weighted means.

The morphological operator may perform an operation for mainly processing a binary image together with a structuring element using an operator such as intersection, union, inclusion, or complement. As used herein, the binary image may refer to an image expressed only by two distinguishable pixel values. The morphological operator may constitute an image process that processes a target object appearing on the binary image on the basis of a feature of the shape of the target object indicated by the structuring element. The morphological operator may include, according to the embodiment, processing such as erosion that reduces the image area, dilation that increases the image area, or a method that uses a morphological gradient, which is a difference between the erosion and dilation. The morphological operator may also be used for a grayscale image and may have as parameters, for example, the radius of the target object indicated by the structuring element of the morphological operator and/or the shape thereof.

The elementwise lockup tables image process may be image processing that diversifies the value of each pixel of an image according to a definition made in a lookup table. The elementwise lookup tables image process may change the contrast of the image. The parameter of the elementwise lookup tables image process may be a parameter of a function defined by the lookup table. Values of the lookup tables may be expressed by a curve based on at least one curvature parameter.

The convolutional operators may constitute an image process that applies a convolutional filter to an input image. The convolutional operators may be, for example, blur operators, sharpening and/or band-pass operators. Parameters of the convolutional operators may include the kernels size (radius) of image convolution and/or the intensity of the used convolutional filter.

The histogram backprojection operators may constitute an image process that changes an image by replacing pixels according to the ratio of number of the pixels on a histogram. In this case, the histogram may be calculated with regard to pixels corresponding to the entire image or a partial area of the entire image. The histogram backprojection operators may have, as parameters thereof, the size and shape of the image for which the histogram is calculated, the bin (interval) of the histogram and the like.

The highpass/lowpass/bandpass filters may constitute an image process that filters an inputted image in a frequency area. The highpass/lowpass/bandpass filters may, in that order, filter the high-frequency area, the low-frequency area, and a specific frequency area of an image expressed in the frequency area. An image, the filtered frequency area of which has disappeared, may be again converted to a time domain and outputted. The highpass/lowpass/bandpass filters may have, as parameters, frequency values that become the standard of filtering.

The threshold operators may constitute an image process that converts an image, which has been quantized at a large number of levels, to an image quantized at two levels. That is, the threshold operators may assign a new pixel value on the basis of a comparison with a constant value, thereby obtaining the result value. This variable may be referred to as a threshold. This variable may be equally applied throughout the entire image, or may adaptively change according to the relative feature of each pixel periphery of the image. The threshold operators may have this variable as a parameter. The value of this variable may be given; alternatively, the same may be computed dynamically in order to ideally divide the image histogram as in the case of Otsu threshold algorithm. The threshold operators may further include, as parameters, the size and shape of the pixel periphery area, which are considered when calculating an adaptively changing variable.

The noise reduction algorithms may constitute an image process for removing small points mainly generated by thermal noise. In an embodiment, the noise reduction algorithms may constitute a median filter for removing speckles. The median filter may replace a given pixel value with a median value of pixels in the periphery of the corresponding pixel. The noise reduction algorithms may be applied to a binary image. Each point of the image may be analyzed individually, and may be filtered according to the feature of each. The noise reduction algorithms may have, as parameters, the size and shape of the pixel periphery area for which the median value is calculated. In addition, the noise reduction algorithms may have, as parameters, the reference size value of points or blobs to be removed.

The complex operators may constitute an image process implemented by artificial neural networks. The complex operators may keep optimizing their parameters by using a training based on the artificial neural networks. Such a training may be performed inside the image process or may be performed on the basis of an inputted external parameter. For example, the complex operators based on the artificial neural networks may be trained such that the same are optimized to sense a specific pattern of an image. In this case, the complex operators based on the artificial neural networks may receive an inputted image and may output, for example, whether the specific pattern is sensed throughout the entire image or in a heat-map type.

The pixel level classifiers may constitute an image process that defines pixel levels and classifies pixels of an input image with regard to each pixel level. The pixel level classifiers may be utilized in a manner similar to that of the image process using artificial neural networks. For example, the pixel level classifiers may be tree classifiers that distinguish pixels according to a classification tree, and the tree classifiers may be used to obtain an estimate regarding whether a given area of an image includes a defect. The pixel level classifiers may output, as a heat-map, the evaluation value of the result of applying the corresponding image process to the entire image. The pixel level classifiers may have, as parameters, the accuracy, the sensitivity, and/or the size and type of a window that determines application target pixels.

The blob detection and labeling algorithms may constitute an image process that senses blobs from an inputted binary image and outputs an image that represents the blots together with continuous numbers indicate the corresponding blobs. In an embodiment, the inputted binary image may include a plurality of blobs that are not connected. The outputted image may be shaped such that respective blobs of the image are indicated by distinguished integer pixel values. The blob detection arid labeling algorithms may have, as parameters, features of blots to be found. For example, the parameters may include the size, area, and/or convexity of the blobs.

The contour detection and shape estimation algorithms may constitute an image process that analyzes and outputs a specific shape or contour, as in the case of the blob detection. This image process may analyze a specific shape or contour of an inputted image and may delete all non-convex blobs from the input image.

The pixelwise arithmetic operators may constitute an image process that performs an arithmetic operation with regard to each pixel of an input image and outputs the result value. A logical operator may be used for such an operation. In an embodiment, the pixelwise arithmetic operators may be performed between different images. In an embodiment, the pixelwise arithmetic operators may process respective pixels using separate metadata. For example, the pixelwise arithmetic operators may set all pixels, which are not included in a specific area defined by the metadata, to zero.

FIG. 5 illustrates a method for evaluating inspection data by a processor according to an embodiment of the present disclosure. As described above, the processor 10 may generate an inspection score by comparing inspection data of an operation based on a predetermined configuration with feature data. The processor 10 may use various methods in order to generate an inspection score by evaluating inspection data.

In an embodiment, when inspection data includes a flag, the processor 10 may generate an inspection score using the flag.

Initially, a taken image of a predetermined part of a target object may be processed by an operation based on a certain configuration. Inspection data obtained as a result of the processing may include a flag that indicates whether the predetermined part includes a defect.

Assuming that the predetermined part has an actual defect, and that the flag of the inspection data indicates that there is no defect, in other words, when an operation based on a certain configuration fails to detect the defect, the processor 10 may classify the flag as FN (False Negative). Assuming that the predetermined part has an actual detect, and that the flag of the inspection data indicates that there is a defect, in other words, when an operation based on a certain configuration has successfully detected the defect, the processor 10 may classify the flag as TP (True Positive). Assuming that the predetermined part has no actual defect, and that the flag of the inspection data indicates that there is a defect, in other words, when an operation based on a certain configuration has erroneously detected a defect, the processor 10 may classify the flag as FP (False Positive). Assuming that the predetermined part has no actual defect, and that the flag of the inspection data indicates that there is no defect, in other words, when an operation based on a certain configuration has successfully confirmed that the operation has no defect, the processor 10 may classify the flag as TN (True Negative). In this regard, the processor 10 may confirm whether the predetermined part of the target object has an actual defect with reference to the feature data 400.

The processor 10 may calculate respective classified flags as: in the case of illustrated equation 5010. In the illustrated equation, TP, TN, FP, and FN may denote the number of flags classified as TP, TN, FP, and FN, respectively. The result value S of the equation 5010 may be an embodiment of the above-mentioned inspection score. The result value S may denote the ratio of flags that are consistent with the content of the feature data among one or more flags the inspection data has.

When the inspection data includes a feature location image, the processor 10 may generate an inspection score using the feature location image. A taken image of a predetermined part of a target object may be processed by an operation based on a certain configuration, and inspection data including a feature location image may be obtained. In an embodiment 5030 of the illustrated feature location image, the defect part of the target object appears as a white line on the image. In addition, in an embodiment 5030 of illustrated feature data, a defect part actually existing on the target object may appear as a white line on the image. In an embodiment, defect parts indicated by the feature location image and the feature data may appear as predetermined areas, for examples, areas marked by white color.

The processor 10 may derive an overlapping area between the area in which a defect indicated by the feature location image 5030 appears and an area in which a defect indicated by the feature data 5020 appears. The processor 10 may generate an inspection score on the basis of the overlapping area.

In an embodiment, the inspection score may be determined as a proportion of the overlapping area to the area in which the defect indicated by the feature data exists.

In an embodiment, the processor 10 may use an intersection-over-union measure in connection with determining the inspection score. The area having a defect indicated by the feature location image of the inspection data may be labeled H, and the area having a defect indicated by the feature data may be labeled L. Each area may be expressed by a pixel number. In this case, an inspection score derived by the intersection-over-union measure may be represented as in the illustrated equation 5040. This inspection score may have a value between 0.0 and 1.0. In the illustrated equation, the numerator may denote the number of pixels belonging to both H and L areas. That is, the numerator may be identical to a result of applying pixelwise "and" operator to both areas. In the illustrated equation, the denominator may denote the number of pixels belong to one of areas H and L. That is, the denominator may be identical to a result of applying pixel-wise "or" operator to both areas.

In an embodiment, the intersection-over-union measure may be performed with regard to each image of each part of the target object, and the result value may be aggregated with regard to the entire part. In an embodiment, an image of the entire part of the target object may be derived, and the intersection-over-union measure may be performed with regard to the image of the entire part.

The method for evaluating inspection data and generating an inspection score by the processor 10 is not limited to the above-mentioned methods.

FIG. 6 illustrates a method for determining a parameter value by a processor during a process of determining a new configuration of an operation according to an embodiment of the present disclosure. As mentioned above, the processor 10 may determine a configuration to be applied after the current configuration, in order to find an optimal configuration of an operation for inspecting a defect of a target object. In the process of determining the next configuration, the processor 10 may determine parameter values of parameters to be applied to image processes of the operation based on the next configuration. The processor 10 may find an optimal configuration that enables the operation to inspect a defect of the target object most accurately, by determining appropriate parameter values. That is, the processor 10 may find parameter values that make the above-mentioned inspection data maximum. To this end, the processor 10 may keep determining parameter values using various methods.

Methods for determining parameter values may largely include discrete methods and continuous methods. When a discrete method is followed, the processor 10 may keep finding a parameter value that gives the optimal result while continuously changing the parameter value by a predetermined gradient. When a partial subset among a plurality of parameters corresponds to a discrete-type parameter, at least a part of the optimization process may have to undergo an optimization process based on the discrete method. In the case of the discrete method, it may be difficult to efficiently estimate or determine a gradient value that is ideal for optimization. When a continuous method is followed, the processor 10 may keep finding a parameter that gives the optimal result while continuously changing the parameter value. It may be possible to find the optimal parameter value, regardless of whether the discrete method or the continuous method is used.

The processor 10 may utilize trial and error manner in order to find an optimal parameter. According to this trial and error method, the processor 10 may randomly determine a parameter value and may evaluate inspection data 300 derived by performing an operation using the value, thereby continuously finding the optimal parameter value. According to the result of evaluating the inspection data 300, that is, the inspection score 500, the process or 10 may again perform the operation using a new parameter value. The processor 10 may repeatedly perform the trial and error method.

When a more accurate defect inspection result is derived as a result of performing an operation after configuring a certain parameter value with regard to a predetermined parameter, that value may be determined as the optimal value of the corresponding parameter, and optimization may be performed through the trial and error manner with regard to a different parameter value. In this case, alternatively, the processor 10 may analyze a certain parameter value that enables derivation of a more accurate defect inspection result and a parameter value that has been applied prior to the same, thereby deriving the tendency, and may determine the next parameter value to be applied to the corresponding parameter on the basis of the tendency. As used herein, the tendency may indicate how the inspection score 500 changes in connection with the direction of change of the parameter value and the magnitude of change thereof. In an embodiment, when a more inaccurate defect inspection result is derived as a result of performing an operation after configuring a certain value with regard to a predetermined parameter, the processor 10 may discard the corresponding value and may revert to the parameter value based on the previous configuration.

In an embodiment, the processor 10 may find an optimal parameter value while successively changing a parameter value to be applied to a predetermined parameter. When the discrete method is used, the processor 10 may change the parameter value by a predetermined gradient; and, when the continuous method is used, the processor 10 may continuously change the parameter value. In addition, when the optimal parameter value of a parameter is determined, the processor 10 may keep determining the optimal parameter of the next parameter one after another.

In an embodiment, the processor 10 may determine a subset of parameters including a plurality of parameters among all parameters and may find an optimal parameter value while continuously changing a parameter value to be applied to the subset of parameters at once. Initially, the processor 10 may apply predetermined parameter values to the subset of parameters. The processor 10 may perform an operation to which pre-determined parameter values have been applied and may obtain a resulting inspection score. When it is determined that application of new parameter values is necessary, the processor 10 may change all parameter values to be applied to the subset of parameters. In this case, the value of other parameters that are not included in the subset of parameters may be fixed. After optimal parameter values of the corresponding subset of parameters are determined, the processor 10 may determine a different subset of parameters and may change parameter values of the determined subset of parameter at once, thereby conducting optimization.

In an embodiment, the processor 10 may find an optimal parameter value while keeping randomly selecting a parameter value to be applied to a predetermined parameter. The processor 10 may perform an operation using the parameter based on the randomly selected parameter value and may determine whether the random parameter value is an optimal parameter value according to the result.

The processor 10 may determine the above-mentioned gradient value. In an embodiment, the processor 10 may determine the appropriate direction of change of a parameter and the appropriate magnitude of change thereof with regard to a subset of the entire data set and may apply the determined direction of change and magnitude of change to the entire data set, thereby determining the above-mentioned gradient value. As used herein, the entire data set may refer to all of a plurality of sets of images, and the subset of the data set may refer to some images of the plurality of sets of images. Initially, the processor 10 may evaluate what result is obtained when an operation based on a changed parameter is applied to a partial subset of the entire data set while continuously changing a parameter value of a predetermined image process. The processor 10 may determine what direction of change and what magnitude of change derive the optimal result through this process. When an appropriate direction of change and an appropriate magnitude of change are determined with regard to the data subset, the processor 10 may apply the same to the entire data set, thereby determining again the appropriateness of the direction of change and the magnitude of change. The processor 10 may determine an appropriate direction of change of the parameter value and the appropriate magnitude of change thereof with regard to the entire data set through this process, and may determine the above-mentioned gradient on the basis thereof. In an embodiment, the subset of the entire data set may be determined randomly. In an embodiment, the processor 10 may determine the gradient of an appropriate parameter value while changing the value of some parameters while the parameter value of the remaining parameters remains fixed.

The processor 10 may use various optimization methods in order to find an optimal parameter of an image process used for an operation. For example, the processor 10 may use a gradient ascent/descent method, which is a primary iterative optimization algorithm for finding the maximum/minimum value of a function in a stepwise manner using a gradient value at one point of the function, or an annealing method that is efficient for a vast range in which an optimal value is to be found as a probabilistic approach for estimating a global optimum in the entire range of a function.

However, the gradient ascent/descent method, for example, may have a problem in that the method may find not the maximum/minimum value in the entire function range, but the local maxima or local minima. For example, a result value based on a specific variable value may be given as in the illustrated graph 6010 of a function. In the illustrated graph 6010, the x-axis may correspond to a specific parameter, that is, a parameter value in the present disclosure, and the y-axis may correspond to a result value based on a specific variable, that is, an inspection score in the present disclosure. The optimal result value in the illustrated graph 6010 may appear as the global maximum or global minimum, and the optimal parameter value may be the parameter value of the global maximum or global minimum. However, when the gradient ascent/descent method is used, for example, the local maxima or local minima, which is the maximum/minimum value in a specific range, may be erroneously determined as the global maximum or global minimum.

In an embodiment, in order to avoid deriving the local maxima or local minima, the processor 10 may apply a random value as the starting point, of an optimization method for finding an optimal parameter value. That is, optimization based on an optimization method may start to proceed at a point in the illustrated graph 6010, and the processor 10 may randomly determine the starting point. This makes it possible to avoid deriving the local maxima or local minima as the result of the optimization method. Optimization started at the random starting point may be repeatedly performed by a fixed number of times, or may be repeatedly performed until a predetermined condition is satisfied. A parameter value that gives the optimal result, among parameter values obtained in the repeated optimization process, may be determined as the optimal parameter value.

In an embodiment, the processor 10 may utilize a Gibbs measure in order to avoid erroneously determining the local maxima or local minima as the global maxima or global minima. The Gibbs measure may be an optimization method that utilizes a probabilistic distribution, which provides a probabilistic representation of an inspection score 500 of an operation based on a parameter value. The function of the probabilistic distribution based on the Gibbs measure may be represented as by the illustrated equation 6020.

In the illustrated equation 6020, $\Theta$ may denote a vector of parameter values, that, is, a set of parameter values. $P(\Theta)$ may denote a set of parameter values, that is, a probability value of $\Theta$ in a parameter space, $\beta$ may denote a parameter of $P(\Theta)$ referred to as an inverse temperature. $Z[\beta]$ may denote a normalizing value that represents the sum of probability values in the entire range of $\Theta$, and may be referred to as a partition function. $E(\Theta)$ represents an evaluation of the result of defect inspection by an operation based on $\Theta$, and may be referred to as an energy function.

The $Z[\beta]$ may be difficult to process because it is associated with the sum of the very large entire parameter space, but a probabilistic distribution may be obtained using a method such as MCMC (Monte Carlo Markov Chain). For example, the MCMC method introduced in "Christophe Andrieu, Nando De Freitas, Arnaud Doucet and Michael I. Jordan An Introduction to MCMC for Machine Learning, 2003", for example, defines a Markov chain, and the stationary distribution of the Markov chain may coincide with the probabilistic distribution of the Gibbs measure. A parameter sample similar to $P(\Theta)$ may be obtained by extracting parameter values from the distribution of the Markov chain. As the $\beta$ value increases, which is an inverse temperature parameter, $P(\Theta)$ may gradually concentrate to the maxima of $E(\Theta)$. Therefore, a parameter sample of $P(\Theta)$ at a point with a large $\beta$ value may be a parameter that becomes the minima, and this may be the optimal parameter that brings the optimal result value.

For example, the parameter may switch from $\Theta 0$ to $\Theta 1$ by a random selection. The new parameter $\Theta 1$ may reduce the value of $E(\Theta)$ compared with $\Theta 0$. In this case, it may be determined that the change to the new parameter $\Theta 1$ is a change in a direction toward the optimal parameter. Alternatively, it is may be determined according to a probability value derived from the illustrated equation 6030 whether a change to the new parameter $\Theta 1$ is necessary. The illustrated equation 6030 may be easily calculated without having to calculate the value of $Z[\beta]$.

FIG. 7 illustrates a branching sub-sequence and a merging sub-sequence according to an embedment of the present disclosure. As described above, a sequence of an operation based on a certain configuration may include at least one sub-sequence, and the sub-sequence may include a branching sub-sequence 7010 and a merging sub-sequence 7020.

In an embodiment, a sequence may include a branching sub-sequence 7010. As described above, a predetermined set of images 7030 may undergo two or more image processes 220 and 221 in a parallel manner during an operation. In this regard, an image process may be one of a plurality of image processes determined according to a configuration of the operation. For example, a predetermined set of images 7030 that have undergone an image process 210 may be inputted to two or more image processes 220 and 221 in the next step. The set of images, after undergoing two or more different image processes 220 and 221, may undergo a line of image processes configured separately.

In an embodiment, a sequence may include a merging sub-sequence 7020. As described above, sets of images 7040 and 7050 that have undergone certain image processes 230 and 231 in a parallel manner may undergo a single identical image process 235.

In an embodiment, image processes 230 and 231 applied in a parallel manner may be the same image process or different image processes. Even if the image processes 230 and 231 are the same image process, sets of images 7060 and 7070 inputted to the image processes 230 and 231 may different from each other, and it may thus be considered that the image processes 230 and 231 are arranged in a parallel manner during the operation. In an embodiment, the sets of images 7040 and 7050 may be different sets of images that have undergone different processing. Sets of images 7040 and 7050 supposed to undergo a single identical image process 235 may be outputted as a single set of images, and may undergo the same line of image processes later.

In an embodiment, M sets of images may be inputted and merged such that N sets of images are outputted. In this case, M and N may be different natural numbers. The M sets of images may be sets of images that have undergone different lines of image processes. The N sets of images may be inputted to N different lines of image processes.

In an embodiment, a plurality of branching sub-sequences and a plurality of merging sub-sequences may be arranged inside a single sequence. In an embodiment, without any restriction requiring that a merging sub-sequence be arranged right after a branching sub-sequence, the branching sub-sequence may be applied again to one of a set of branching images. In an embodiment, after merging a set of images, the merging sub-sequence may not undergo a single identical image process, and may generate inspection data directly using the set of merging images.

In an embodiment, image processes included in a branching sub-sequence and a merging sub-sequence may be image processes selected from the above-mentioned plurality of image processes according to a certain configuration of the operation.

FIG. 8 illustrates an embodiment of an operation optimization method that may be performed by an electronic device 1 according to the present disclosure. Although respective steps of a method or algorithm according to the present disclosure are described in a successive order in the, illustrated flowchart, respective steps may also be performed in any combinations and/or in any order according to the present disclosure. The description with reference to the present flowchart does not exclude applying a change or modification to the method or algorithm, and does not mean that a certain step is necessary or preferred. In an embodiment, at least some steps may be performed in a parallel, repeated, or heuristic manner. In an embodiment, at least some steps may be omitted, or different steps may be added.

The electronic device 1 according to the present disclosure may perform an operation optimization method according to various embodiments of the present disclosure, in connection with processing one or more sets of images and thereby inspecting a defect of a target object. The operation optimization method according to an embodiment of the present disclosure may include a step of capturing one or more sets of images of a target object (S100); a step of determining a predetermined configuration of an operation (S200); a step of performing an operation based on the predetermined configuration with regard to one or more sets of images (S300); a step of generating inspection data from the processed one or more sets of images (S400); a step of comparing the inspection data with feature data and thereby generating an inspection score (S500); and/or a step of setting the predetermined configuration as an optimal configuration (S610) or determining a configuration to be applied after the predetermined configuration (S620) according to whether the inspection score satisfies a predetermined threshold score (S600).

In Step S100, the camera 40 of the electronic device 1 may capture one or more sets of images of the target object. In Step S200, the processor 10 may determine a predetermined configuration (for example, first configuration) of the operation for processing one or more sets of images. In Step S300, the processor 10 may perform the operation based on the predetermined configuration (for example, first configuration) that has been determined, with regard to one or more sets of images.

In Step S400, the processor 10 may generate inspection data 300 regarding a defect or feature of the target object from the one or more sets of images processed according to the predetermined configuration (for example, first configuration). In Step S500, the processor 10 may compare the inspection data with feature data 400 regarding a defect or feature of the target object, stored in the memory, thereby generating an inspection score 500.

In steps S600 to S620, the processor 10 may determine whether the generated inspection score is equal to or larger than a predetermined threshold score and may set the current configuration in which the inspection score 500 satisfies the predetermined threshold score, that is, the predetermined configuration (for example, first configuration), as the optimal configuration. In an embodiment, the processor 10 may store the predetermined configuration determined as the optimal configuration in the memory 20. When the inspection score 500 fails to satisfy the predetermined threshold score, the processor 10 may determine a configuration (for example, second configuration) to be applied after the current configuration.

In an embodiment of the operation optimization method according to the present disclosure, the step of determining a predetermined configuration of the operation (S200) may include a step of selecting (determining), by the processor 10, a set of images (for example, first set of images) to which the operation based on the predetermined configuration (for example, first configuration) is to be applied, from a plurality of sets of images. In addition, Step S200 may include a step of determining a set of image processes (for example, first set of image processes) included in the operation based on the predetermined configuration (for example, first configuration) among a plurality of image processes. In addition, Step S200 may include a step of determining values of a parameter (for example, first parameter value) used for an image process of a set of image processes (for example, first set of image processes) by the processor 10. In addition, Step S200 may include a step of determining an application sequence (for example, first sequence) of a set of image processes (for example, first set of image processes) to be applied to a set of images (for example, first set of images) by the processor 10.

In an embodiment, the step of processing a plurality of sets of images according to the predetermined configuration (S300) may include a step of applying a set of images processes (for example, first set of image processes) having values of a parameter (for example, first parameter value) to a set of images (for example, first set of images) and processing, the same by the processor 10.

In an embodiment, the step of generating an inspection score (S500) may include a step of obtaining one or more flags from inspection data 300 by the processor 10, the flags indicating whether the target object at least one predetermined exterior feature or exterior defect; a step of comparing each of the one or more flags with feature data 400 and determining whether each of the one or more flags is consistent with feature data 400; and/or a step of generating an inspection score that indicates the ratio of the number of flags that are consistent with the feature data 400 with regard to the entire number of the one or more flags.

In an embodiment, the step of generating an inspection score (S500) may include a step of obtaining an area (for example, first area), in which at least one predetermined exterior feature or exterior defect of the target object exists, from the inspection data 300 by the processor 10; a step of obtaining an area (for example, first area), in which at least one exterior feature or exterior defect of the target object exists, front the feature data 400; a step of determining an overlapping area between the two areas (for example, first and second areas); and/or a step of generating an inspection score that indicates the proportion of the overlapping area against an area (for example, second area) in which a defect or feature indicated by the feature data 400 exists.

In an embodiment, the step of determining the next configuration (for example, second configuration) of the operation (S620) may include a step of determining, for example, by the processor 10, a set of images (for example, second set of images) of the next configuration among a plurality of sets of images; determining a set of image processes (for example, second set of image processes) of the next configuration among a plurality of image processes; determining values of a parameter (for example, second parameter value) to be used for a set of image processes (for example, second set of image processes) of the next configuration; and determining a sequence (for example, second sequence) in which a set of image processes (for example, second set of image processes) of the next configuration are to be applied. The processor 10 may determine the next configuration (for example, second configuration) of the operation based on a difference between an inspection score based on a predetermined configuration (for example, first configuration) and the above-mentioned predetermined threshold score.

In an embodiment, the step of determining the next configuration (for example, second configuration) of the operation (S620) may include a step of deriving a difference between an inspection score generated using a configuration that has been applied to the operation prior to a predetermined configuration (for example, first configuration) and an inspection score generated using a predetermined configuration (for example, first configuration). In addition, Step S620 may include a step of modifying, for example, by the processor 10, the predetermined configuration (for example, first configuration) on the basis of the derived difference and thereby determining the next configuration (for example, second configuration).

In an embodiment, the step of determining the next configuration (for example, second configuration) of the operation (S620) may include a step of performing an operation based on the next configuration (for example, second configuration), for example, by the processor 10. That is, Step S620 may include a step of applying, for example, by the processor 10, a set of image processes (for example, second set of image processes) having values of a parameter (for example, second parameter value) to a set of images (for example, second set of images) according to an application sequence (for example, second sequence) and thereby processing the same.

In an embodiment, one or more sets of images of the target object may be those captured under one or more predetermined settings. In an embodiment, the one or more predetermined settings may include, for example, the type, amount, and arrangement of the light source 30, the type, amount, and arrangement of the camera 40, parameters related to the tight source 30, parameters related to the camera 40, the wavelength of light, the illumination of light, the angle at which light is irradiated to the target object and/or any combinations thereof.

In an embodiment, a sequence (for example, first configuration) based on a predetermined configuration (for example, first configuration) may include a sub-sequence for parallel application of at least two different image processes among a set of image processes (for example, first set of image processes) to a set of images (for example, first set of images).

In an embodiment, a sequence (for example, first configuration) based on a predetermined configuration (for example, first configuration) may include a sub-sequence for application of a single image process to a set of image processes (for example, first set of images) to which at least two different images processes among a set of image processes (for example, first set of image processes) have been applied in a parallel manner.

Various embodiments of the present disclosure may be implemented as software in a machine-readable storage medium. The software may be software for implementing various embodiments of the present disclosure. The software may be inferred from various embodiments of the present disclosure by programmers in the technical field to which the present disclosure pertains. For example, the software may be a machine-readable program including an instruction (for example, code or code segment). The machine may be a device capable of operating according to a retrieved instruction, for example, a computer. In an embodiment, the machine may be an electronic device according to embodiments of the present disclosure. In an embodiment, the processor of the machine may execute a retrieved instruction such that elements of the machine perform a function corresponding to the instruction. In an embodiment, the processor may be a processor 10 according to embodiments of the present disclosure. The storage medium may refer to any type of machine-readable recording medium that stores data. The storage medium may include, for example, a ROM, a RAM, a CD-ROM, a magnetic tape, a floppy disk, an optical data storage device and the like. In an embodiment, the storage medium may be a memory 20. In an embodiment, the storage medium may be implemented so as to be distributed over a computer system connected through a network or the like. The software may be distributed over a computer system or the like, stored therein, and performed accordingly. The storage medium may be a non-transitory storage medium. The non-transitory storage medium refers to a tangible medium regardless of whether data is stored semi-permanently or temporarily, and does not include any signal that propagates in a transitory manner.

Although the technical idea of the present disclosure has been described above with reference to various embodiments, the technical idea of the present disclosure includes various substitutions, modifications, and changes that could be made within a scope that could be understood by a person skilled in the art to which the present disclosure pertains. Furthermore, such substitutions, modifications, and changes are to be understood as being included in the accompanying claims.

MODE FOR THE INVENTION

Various embodiments of the present disclosure have been described in the Best Mode.

INDUSTRIAL APPLICABILITY

The present disclosure is applicable to a field related to inspection of a target object.

The invention claimed is:
1. An apparatus for optimizing an inspection of an exterior of a target object, comprising:
a light source configured to irradiate light to the target object;
at least one camera configured to capture one or more sets of images of the target object, each set of images being captured under one or more predetermined settings;
a memory configured to store the one or more sets of images of the target object and feature data including one or more predetermined exterior features of the target object; and
a processor configured to:
obtain the one or more sets of images from the memory;
determine a first configuration of an operation for processing the one or more sets of images to inspect the target object, wherein the first configuration includes at least one of a first set of images on which the operation is to be performed among the one or more sets of images, a first set of image processes to be performed in the operation among a plurality of image processes, first parameter values for the first set of image processes, and a first sequence that each image process of the first set of image processes is performed in the operation;
perform the operation on the first set of images under the first configuration;
generate inspection data on the exterior of the target object from the first set of images that has been processed under the first configuration;
generate an inspection score that indicates a proportion in pixels of an overlapping area between a first area on the target object from the inspection data and a second area on the target object from the feature data with respect to the second area;
compare the inspection score with a predetermined threshold score;
set the first configuration as an optimal configuration of the operation if the inspection score satisfies the predetermined threshold score;
determine a second configuration of the operation by modifying the first configuration if the inspection score does not satisfy the predetermined threshold score; and
control the light source and the at least one camera to obtain additional sets of images of the target object in settings that are different from the one or more predetermined settings, when inspection scores do not satisfy the predetermined threshold score after repeating the modification of configurations of the operation a predetermined number of times,
wherein the one or more predetermined settings include at least one of a type of the light source, amount and arrangement of the at least one camera, parameters related to the light source, or parameters related to the at least one camera.

2. The apparatus of claim 1, wherein the processor, when generating the inspection score, is further configured to:
obtain one or more flags from the inspection data, each of the one or more flags indicating whether the exterior of the target object includes at least one of the predetermined exterior features;
determine whether each of the one or more flags is consistent with the feature data stored in the memory; and
generate the inspection score that indicates a ratio of a number of flags that are consistent with the feature data to a total number of the one or more flags.

3. The apparatus of claim 1, wherein the processor, when generating the inspection score, is further configured to:
obtain the first area on the target object from the inspection data, the first area including at least one of the predetermined exterior features;
obtain the second area on the target object from the feature data pre-stored in the memory, the second area including the at least one of the predetermined exterior features;
determine the overlapping area between the first area and the second area; and
generate the inspection score that indicates the proportion of the overlapping area with respect to the second area.

4. The apparatus of claim 1, wherein the processor, when determining the second configuration, is further configured to:
determine at least one of a second set of images from the one or more sets of images, a second set of image processes from the plurality of image processes, second parameter values for the second set of image processes, and a second sequence of the second set of image processes, according to a difference between the inspection score and the predetermined threshold score.

5. The apparatus of claim 4, wherein the processor is further configured to perform the operation under the second configuration.

6. The apparatus of claim 1, wherein the processor, when determining the second configuration, is further configured to:
derive a difference between a previous inspection score, which has been generated using a previous configuration of the operation before performing the operation under the first configuration, and the inspection score generated using the first configuration of the operation; and
determine the second configuration by modifying the first configuration according to the derived difference.

7. The apparatus of claim 1, wherein the one or more predetermined settings further include at least one of a wavelength of the light irradiated to the target object, an irradiation angle of the light into the target object, an illumination of the light, or a type of the at least one camera.

8. The apparatus of claim 1, wherein the first sequence includes a sub-sequence that applies at least two different image processes, among the first set of image processes, to the first set of images in parallel.

9. The apparatus of claim 8, wherein the first sequence includes a sub-sequence that applies a single image process, among the first set of image processes, to the first set of images after applying the at least two different image processes to the first set of images in parallel.

10. A method for optimizing an inspection of an exterior of a target object, comprising:
irradiating, by a light source, light to the target object;
capturing, by at least one camera, one or more sets of images of the target object, each set of images being captured under one or more predetermined settings;
determining a first configuration of an operation for processing the one or more sets of images to inspect the target object, wherein the first configuration includes at least one of a first set of images on which the operation is to be performed among the one or more sets of images, a first set of image processes to be performed in the operation among a plurality of image processes, first parameter values for the first set of image processes, and a first sequence that each image process of the first set of image processes is performed in the operation;
performing the operation on the first set of images under the first configuration;
generating inspection data on the exterior of the target object from the first set of images that has been processed under the first configuration;
generating an inspection score that indicates a proportion in pixels of an overlapping area between a first area on the target object from the inspection data and a second area on the target object from feature data with respect to the second area, the feature data being stored in a memory and including one or more predetermined exterior features of the target object;
comparing the inspection score with a predetermined threshold score;
setting the first configuration as an optimal configuration of the operation if the inspection score satisfies the predetermined threshold score;
determining a second configuration of the operation by modifying the first configuration if the inspection score does not satisfy the predetermined threshold score; and
controlling the light source and the at least one camera to obtain additional sets of images of the target object in settings that are different from the one or more predetermined settings, when inspection scores do not satisfy the predetermined threshold score after repeating the modification of configurations of the operation a predetermined number of times,
wherein the one or more predetermined settings include at least one of a type of the light source, amount and arrangement of the at least one camera, parameters related to the light source, or parameters related to the at least one camera.

11. The method of claim 10, wherein the generating the inspection score includes:
obtaining one or more flags from the inspection data, each of the one or more flags indicating whether the exterior of the target object includes at least one of the predetermined exterior features;
determining whether each of the one or more flags is consistent with the feature data pre-stored in the memory; and
generating the inspection score that indicates a ratio of a number of flags that are consistent with the feature data to a total number of the one or more flags.

12. The method of claim 10, wherein the generating the inspection score includes:
obtaining the first area on the target object from the inspection data, the first area including at least one of the predetermined exterior features;

obtaining the second area on the target object from the feature data pre-stored in the memory, the second area including the at least one of the predetermined exterior features;

determining the overlapping area between the first area and the second area; and generating the inspection score that indicates the proportion of the overlapping area with respect to the second area.

13. The method of claim 10, wherein the determining the second configuration for the operation includes determining at least one of a second set of images from the one or more sets of images, a second set of image processes from the plurality of image processes, second parameter values for the second set of image processes, and a second sequence of the second set of image processes, according to a difference between the inspection score and the predetermined threshold score.

14. The method of claim 13, further comprising performing the operation under the second configuration.

15. The method of claim 10, wherein the determining the second configuration for the operation includes:

deriving a difference between a previous inspection score, which has been generated using a previous configuration of the operation before performing the operation under the first configuration, and the inspection score generated using the first configuration of the operation; and determining the second configuration by modifying the first configuration according to the derived difference.

16. The method of claim 10, wherein the one or more predetermined settings further include at least one of a wavelength of light irradiated to the target object for capturing the one or more sets of images of the target object, an irradiation angle of the light into the target object, an illumination of the light, or a type of at least one camera configured to capture the one or more sets of images of the target object.

17. The method of claim 10, wherein the first sequence includes a sub-sequence that applies at least two different image processes, among the first set of image processes, to the first set of images in parallel.

18. The method of claim 17, wherein the first sequence includes a sub-sequence that applies a single image process, among the first set of image processes, to the first set of images after applying the at least two different image processes to the first set of images in parallel.

* * * * *